(12) United States Patent
Ozcan et al.

(10) Patent No.: US 12,474,261 B2
(45) Date of Patent: Nov. 18, 2025

(54) PULSE SHAPING USING DIFFRACTIVE NETWORK DEVICE WITH MODULAR DIFFRACTIVE LAYERS

(71) Applicant: THE REGENTS OF THE UNIVERSITY OF CALIFORNIA, Oakland, CA (US)

(72) Inventors: Aydogan Ozcan, Los Angeles, CA (US); Deniz Mengu, Los Angeles, CA (US); Yair Rivenson, Los Angeles, CA (US); Muhammed Veli, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 184 days.

(21) Appl. No.: 18/010,207

(22) PCT Filed: Jun. 28, 2021

(86) PCT No.: PCT/US2021/039459
§ 371 (c)(1),
(2) Date: Dec. 14, 2022

(87) PCT Pub. No.: WO2022/006018
PCT Pub. Date: Jan. 6, 2022

(65) Prior Publication Data
US 2023/0251189 A1 Aug. 10, 2023

Related U.S. Application Data

(60) Provisional application No. 63/045,757, filed on Jun. 29, 2020.

(51) Int. Cl.
*G01N 21/3586* (2014.01)
*G02B 27/42* (2006.01)

(52) U.S. Cl.
CPC ..... *G01N 21/3586* (2013.01); *G02B 27/4233* (2013.01)

(58) Field of Classification Search
CPC ........... G01N 21/3586; G02B 27/4233
See application file for complete search history.

(56) References Cited

U.S. PATENT DOCUMENTS 11,392,830 B2    7/2022  Ozcan et al.
2021/0142170 A1*  5/2021  Ozcan ............... G02B 27/4205
(Continued)

FOREIGN PATENT DOCUMENTS

WO    WO 2019/200289 A1    10/2019
WO    WO 2020/247828 A1    12/2020
(Continued)

OTHER PUBLICATIONS

PCT International Search Report for PCT/US2021/039459, Applicant: The Regents of the University of California, Form PCT/ISA/210 and 220, dated Oct. 1, 2021 (3 pages).
(Continued)

*Primary Examiner* — Chih-Cheng Kao
(74) *Attorney, Agent, or Firm* — VISTA IP LAW GROUP LLP

(57) ABSTRACT

A diffractive network is disclosed that utilizes, in some embodiments, diffractive elements, which are used to shape an arbitrary broadband pulse into a desired optical waveform, forming a compact and passive pulse engineering system. The diffractive network was experimentally shown to generate various different pulses by designing passive diffractive layers that collectively engineer the temporal waveform of an input terahertz pulse. The results constitute the first demonstration of direct pulse shaping in terahertz spectrum, where the amplitude and phase of the input wavelengths are independently controlled through a passive
(Continued)

diffractive device, without the need for an external pump. Furthermore, a modular physical transfer learning approach is presented to illustrate pulse-width tunability by replacing part of an existing diffractive network with newly trained diffractive layers, demonstrating its modularity. This learning-based diffractive pulse engineering framework can find broad applications in e.g., communications, ultra-fast imaging and spectroscopy.

23 Claims, 26 Drawing Sheets

(56) References Cited

U.S. PATENT DOCUMENTS

| | | | | |
|---|---|---|---|---|
| 2022/0253685 A1* | 8/2022 | Ozcan | | G06N 3/084 |
| 2022/0327371 A1* | 10/2022 | Ozcan | | G02B 27/4277 |
| 2023/0024787 A1* | 1/2023 | Ozcan | | G06N 3/0985 |

FOREIGN PATENT DOCUMENTS

| | | |
|---|---|---|
| WO | WO 2021/050550 A1 | 3/2021 |
| WO | WO 2021/231139 A1 | 11/2021 |
| WO | WO 2021/237170 A1 | 11/2021 |
| WO | WO 2022/056422 A1 | 3/2022 |
| WO | WO 2022/087345 A1 | 4/2022 |

OTHER PUBLICATIONS

PCT Written Opinion of the International Search Authority for PCT/US2021/039459, Applicant: The Regents of the University of California, Form PCT/ISA/237, dated Oct. 1, 2021 (7 pages).

Luo, Yi et al., Design of task-specific optical systems using broadband diffractive neural network, Light: Science & Applications (2019) 8:112.

Veli, Muhammed, Machine Learning-Enabled Optical Sensors and Devices, University of California, Los Angeles dissertation, escholarship. org., 2020, 13 pages.

Shawn Divitt et al., Ultrafast Optical Pulse Shaping using Dielectric Metasurfaces, Science. May 3, 20191; 364(6443):890-894.

Mohammed R Hashemi et al., Reconfigurable metamaterials for terahertz wave manipulation, Rep. Prog. Phys. 80 (2017) 094501 (19pp).

Jingxi Li et al., Class-specific Differential Detection in Diffractive Optical Neural Networks Improves Inference Accuracy, (2019) (21 pages).

Xing Lin et al., All-optical machine learning using diffractive deep neural networks, Science, 10.1126/science.aat8084 (2018).

Yongqian Liu et al., Terahertz Waveform Synthesis via Optical Pulse Shaping, IEEE Journal of Selected Topics in Quantum Electronics, vol. 2, No. 3, Sep. 1996.

Yi Luo et al., Design of task-specific optical systems using broadband diffractive neural networks, Light: Science & Applications (2019) 8:112.

Pablo Marin-Palomo et al., Microresonator solitons for massively parallel coherent optical communications, arXiv:1610.01484v4 [nlin. PS] Apr. 17, 2017.

Eesa Rahimi et al., Thermally controlled femtosecond pulse shaping using metasurface based optical filters, Nanophotonics 2018; aop, https://doi.org/10.1515/nanoph-2017-0089, revised Nov. 17, 2017; accepted Nov. 27, 2017.

Donna Strickland et al., Compression of Amplified Chirped Optical Pulses, Optics Communications, Dec. 1, 1985, vol. 56, No. 3 (3 pages).

V.R. Supradeepa et al., Femtosecond pulse shaping in two dimensions: Towards higher complexity optical waveforms, Optics Express, Aug. 4, 2008, vol. 16, No. 16, 11878-11887.

Robert Szipocs et al., Chirped multilayer coatings for broadband dispersion control in femtosecond lasers, Optics Letters, Feb. 1, 1994, vol. 19, No. 3, 201-203.

P. P. Vabishchevich et al., Femtosecond Pulse Shaping with Plasmonic Crystals, ISSN 0021!3640, JETP Letters, 2015, vol. 101, No. 12, pp. 787-792. © Pleiades Publishing, Inc., 2015.

A. M. Weiner et al., Femtosecond pulse shaping using spatial light modulators, Review of Scientific Instruments, vol. 71, No. 5, May 2000, 1929-1960.

Andrew M. Weiner, Ultrafast optical pulse shaping: A tutorial review, Optics Communications 284 (2011) 3669-3692.

Nezih Tolga Yardimci et al., High Sensitivity Terahertz Detection through Large-Area Plasmonic Nano-Antenna Arrays, Scientific Reports, 7:42667, DOI: 10.1038/srep42667 (2017).

D. Yelin, D. Meshulach et al., Adaptive femtosecond pulse compression, Optics Letters, Dec. 1, 1997, vol. 22, No. 23, 1793-1795.

Erik Zeek et al., Pulse compression by use of deformable mirrors, Optics Letters, Apr. 1, 1999, vol. 24, No. 7, 493-495.

PCT International Preliminary Report on Patentability (Chapter I of the Patent Cooperation Treaty) for PCT/US2021/039459, Applicant: The Regents of the University of California, Form PCT/IB/326 and 373, dated Jan. 12, 2023 (9 pages).

* cited by examiner

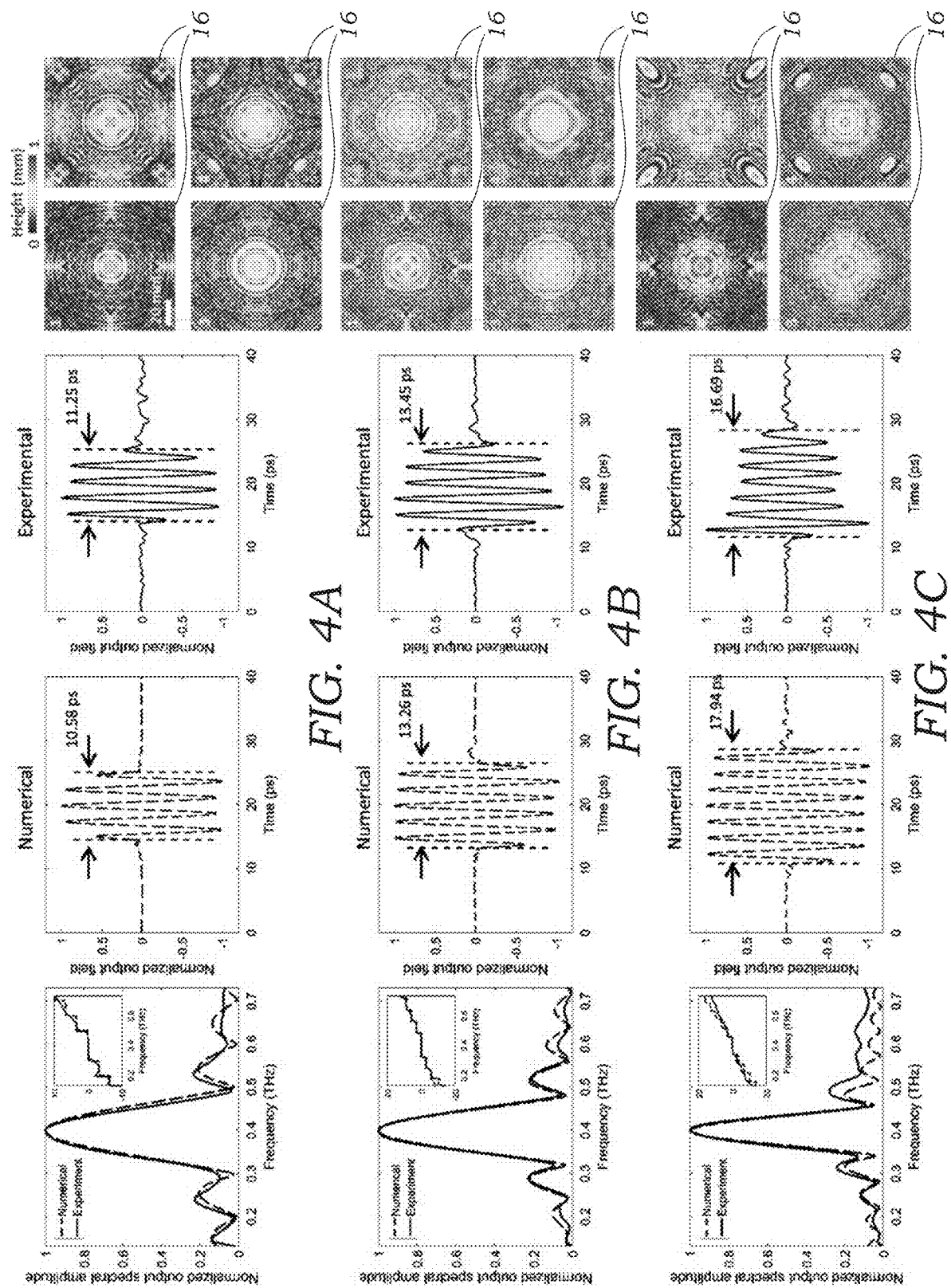

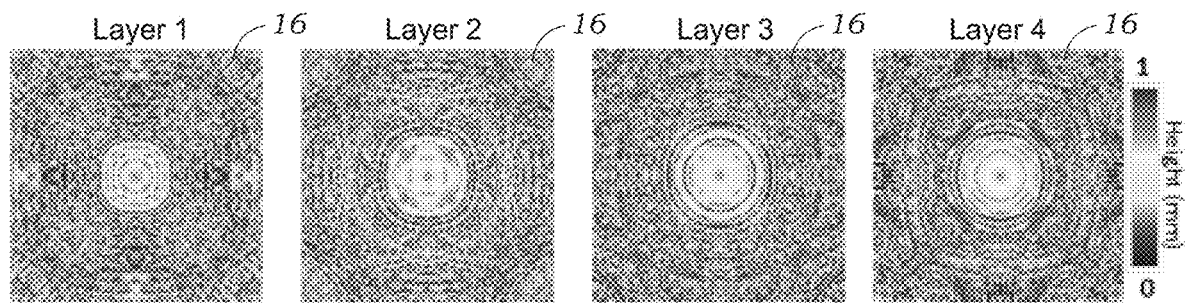
FIG. 7A
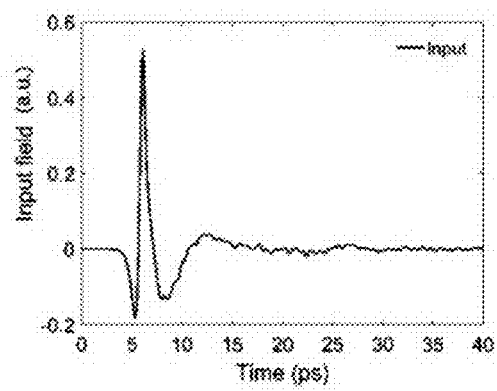 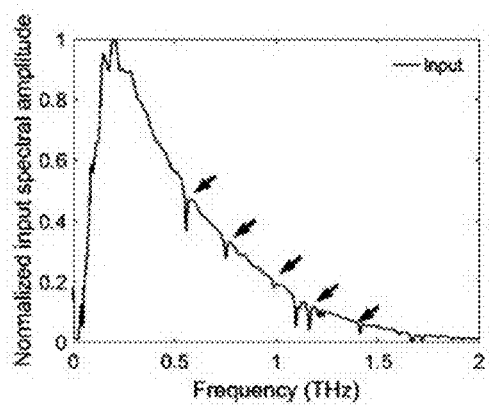
FIG. 7B
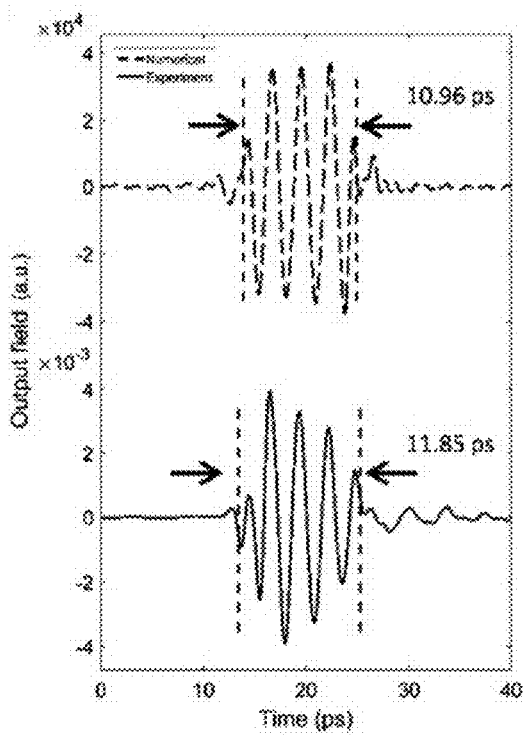 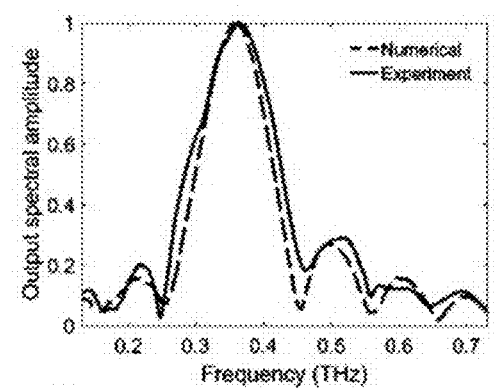
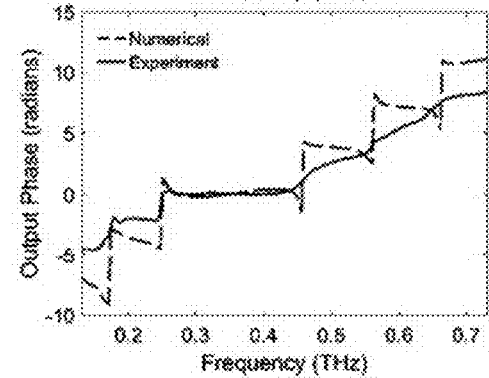
FIG. 7C

PULSE SHAPING USING DIFFRACTIVE NETWORK DEVICE WITH MODULAR DIFFRACTIVE LAYERS

RELATED APPLICATION

This Application is a U.S. National Stage filing under 35 U.S.C. § 371 of International Application No. PCT/US2021/039459, filed on Jun. 28, 2021, which claims priority to U.S. Provisional Patent Application No. 63/045,757 filed on Jun. 29, 2020, which is are hereby incorporated by reference. Priority is claimed pursuant to 35 U.S.C. §§ 119, 371 and any other applicable statute.

TECHNICAL FIELD

The technical field generally relates to a diffractive network that is used to shape an arbitrary broadband pulse or waveform into a desired optical waveform shape or profile. The technical field further relates to diffractive network that uses modular diffractive elements that are used to tune the output waveform shape or waveform profile.

BACKGROUND

Inspired by the neural interactions in human brain, artificial neural networks and deep learning have been transformative in many fields, providing solutions to a variety of data processing problems, including for example image recognition, natural language processing and medical image analysis. Data-driven training of deep neural networks has set the state-of-the-art performance for various applications in e.g., optical microscopy, holography and sensing, among others. Beyond these applications, deep learning has also been harnessed to solve inverse physical design problems arising in e.g., nanophotonics, plasmonics, among others. Beyond these applications, deep learning has also been utilized to solve inverse physical design problems arising in e.g., nanophotonics and plasmonics. These advances cover a wide range of engineering applications and have motivated the development of new optical computing architectures that aim to benefit from the low-latency, power-efficiency and parallelization capabilities of optics in the design of machine learning hardware. For example, Diffractive Deep Neural Networks ($D^2NN$) have been introduced as an optical machine learning framework that uses deep learning methods, e.g., stochastic gradient-descent and error-backpropagation, to train a set of diffractive layers for computing a given machine learning task as the light propagates through these layers. Early studies conducted on this framework showed its statistical inference capabilities, achieving >98% numerical blind testing[32] accuracy for the classification of the images of handwritten digits. Recently, the $D^2NN$ framework has also been extended to harness broadband radiation in order to design spatially-controlled wavelength de-multiplexing systems, however this work did not engineer the spectral phase values at different frequencies of the input radiation and therefore did not report any temporal wave control or pulse shaping.

In parallel to these recent advances at the intersection of optics and machine learning, there has been major progress in optical pulse shaping, including pulse compression for optical telecommunication and pulse stretching for chirped pulse amplification. Dynamic, customizable temporal waveform synthesis has been achieved using time or frequency domain modulation. Among different approaches, the Fourier-transform based configuration, which relies on conventional optical components such as lenses to establish a mapping between the pixels of an optical modulation device and the spectral components of the input broadband light, is one of the most commonly employed techniques. In various forms of its implementation, the optical modulation device placed at the Fourier plane in between two gratings can be a dynamic component e.g., a spatial light modulator, an acousto-optic modulator, a movable mirror or even a metasurface, offering engineered dispersion and wavefront manipulation, tailored for different applications.

However, these earlier pulse shaping techniques have restricted utility at some parts of the electromagnetic spectrum, such as the terahertz band, due to the lack of advanced optical components that can provide spatio-temporal modulation and control of complex wavefronts, covering both a broad bandwidth and a high spectral resolution at these frequencies. As a result, direct shaping of terahertz pulses by independent control of the spectral amplitude and phase of the input wavelengths has not been achieved to date; instead, the synthesis of terahertz pulses has been generally performed indirectly through the engineering of the optical-to-terahertz converters or shaping of the optical pulses that pump terahertz sources. Previous work also demonstrated an active device using an external pump-induced inhomogeneous medium to shape input terahertz pulses.

SUMMARY

Disclosed herein are diffractive networks designed by deep learning to all-optically shape pulses by simultaneously controlling the relative phase and amplitude of each spectral component across a continuous and wide range of frequencies using only trainable diffractive layers, forming a small footprint and a compact pulse engineering system. This framework uses a deep learning-based physical design strategy to devise task-specific diffractive systems that can shape various temporal waveforms of interest. Following the digital training stage in a computer, the resulting diffractive layers are fabricated and the success of the pulse-shaping diffractive networks were experimentally demonstrated by generating pulses with various temporal widths using a broadband terahertz pulse as input.

The diffractive networks produce direct pulse shaping in the terahertz part of the spectrum, where a complex-valued spectral modulation function that is trained using deep learning directly acts on terahertz frequencies for pulse engineering. The disclosed learning-based approach can shape any input terahertz pulse through diffraction and is fundamentally different from previous approaches that indirectly synthesize a desired terahertz pulse through optical-to-terahertz converters or shaping of the optical pump that interacts with terahertz sources. This new capability of direct pulse shaping in terahertz band enables new opportunities that could not be explored with indirect pulse shaping approaches. In different scenarios, precise engineering of terahertz pulses with state-of-the-art methods is either not possible or very hard and costly to achieve, including e.g., pulsed terahertz generation through quantum cascade lasers, solid-state circuits and particle accelerators. Furthermore, the disclosed deep learning-based framework is quite flexible and versatile that can be used to engineer terahertz pulses regardless of their polarization state, beam shape, beam quality, aberrations and other features of the specific terahertz generation mechanism.

Despite using passive diffractive layers, the presented pulse shaping networks offer temporal pulse-width tunability that is experimentally demonstrated by varying the inter-layer distances within a fabricated diffractive network. A physical transfer learning approach was investigated to show the modularity of the design space provided by this system. For example, a subset of diffractive layers as part of an already trained and experimentally validated pulse shaping diffractive network design were replaced with newly trained diffractive layers to synthesize optical square pulses with different pulse-widths. All the experimental results of the 3D-fabricated pulse shaping diffractive networks presented herein are in very good agreement with the numerically expected outputs, emphasizing the accuracy and robustness of the forward models used during the training of these diffractive networks.

In addition to engineering terahertz pulses, the fundamental design approach and diffractive network devices that are created thereby can be readily adapted to different parts of the electromagnetic spectrum for shaping pulses even outside the terahertz range. Finally, this system shows a vital progress towards the engineering and precise control of electromagnetic fields through deep learning-designed diffractive networks into time-domain shaping of pulses, further motivating the development of all-optical machine learning and information processing platforms that can better harness the 4D spatio-temporal information carried by light.

In one embodiment, a diffractive network device for altering a shape or profile of an input optical pulse or waveform includes a plurality of optically transmissive and/or reflective layers arranged in one or more optical paths, each of the plurality of optically transmissive and/or reflective layers comprising a plurality of physical features formed on or within the optically transmissive and/or reflective layers and having different complex-valued transmission and/or reflection coefficients as a function of lateral coordinates across each layer, wherein the plurality of optically transmissive and/or reflective layers and the plurality of physical features thereon collectively define a desired output pulse shape or waveform profile created by optical diffraction/reflection through/off the plurality of optically transmissive and/or reflective layers in response to the input of the optical pulse or waveform.

In another embodiment, a method of altering a shape or profile of an input optical pulse or waveform using a diffractive network device, includes: passing the input optical pulse or waveform through or onto a diffractive optical neural network device that is formed from a plurality of optically transmissive and/or reflective layers arranged in one or more optical paths, each of the a plurality of optically transmissive and/or reflective layers comprising a plurality of physical features formed on or within a plurality of optically transmissive and/or reflective layers and having different complex-valued transmission and/or reflection coefficients as a function of lateral coordinates across each layer, wherein a plurality of optically transmissive and/or reflective layers and the plurality of physical features thereon collectively define a desired output pulse shape or waveform profile created by optical diffraction/reflection through/off a plurality of optically transmissive and/or reflective layers in response to the input optical pulse or waveform.

In some embodiments, one or more of the layers are modular and can be swapped or replaced with replacement layers to alter the output pulse shape or waveform profile. These can, for example, be inserted into a housing that holds the optically transmissive and/or reflective layers. Separately or in addition to, the distance between one or more layers may be modified to tune the output pulse shape or waveform profile.

BRIEF DESCRIPTION OF THE DRAWINGS

FIG. 2A shows a 3D printed pulse shaping diffractive network that experimentally generates a square pulse with a width of 15.57 ps. FIG. 2B shows the schematic of the THz-TDS setup used in the experiments. The solid line represents the optical path of a 780 nm femtosecond laser, and the arrow-containing line represents the terahertz beam. Dashed lines show the input and output apertures of the diffractive network. FIG. 2C shows the physical system layout of the pulse shaping broadband diffractive network design. The input and output apertures are squares, with edge lengths of 0.8 cm and 0.2 cm, respectively. Gray regions on the aperture planes represent aluminum coating to block light transmission. FIG. 2D shows a photo of the experimental setup.

FIG. 3A shows the thickness profiles of the resulting diffractive layers after deep learning-based training in a computer. These diffractive layers can synthesize a square pulse with a width of 15.69 ps over the output aperture for an input pulse shown in FIG. 3B. FIG. 3B shows the normalized amplitude of the input terahertz pulse measured right after the input aperture; in time-domain (left) and spectral domain (right). The arrows on the measured spectral amplitude profile represent the water absorption bands at terahertz frequencies. FIG. 3C: Left: Amplitude of the numerically computed (top) and experimentally measured (lower) pulses in time domain. Top right: The normalized spectral amplitudes corresponding to the numerically computed (top) and experimentally measured (lower) pulses. Bottom right: Unwrapped spectral phase distributions computed based on the numerical forward model (stair-step) and experimentally measured pulse.

FIGS. 4A-4C illustrates experimental validation of different generic pulse shaping diffractive networks. From left to right (for all FIGS.), the numerically computed (middle) and experimentally measured (right) normalized spectral amplitudes are illustrated with inset plots showing the corresponding unwrapped spectral phase profiles, the numerically calculated normalized amplitude of the output pulse, the experimentally measured normalized amplitude of the output pulse and the thickness profiles of the diffractive layers resulting from deep learning-based training in a computer for synthesizing the desired (ground truth) square pulses with pulse-widths of: 10.52 ps (FIG. 4A), 13.02 ps (FIG. 4B) and 17.98 ps (FIG. 4C).

FIG. 5A: Numerically calculated and experimentally measured temporal pulse widths and FIG. 5B the corresponding shifts in the center frequency location are depicted as a function of the inter-layer distances of a pulse shaping diffractive network that was originally trained for synthesizing a square pulse of 15.50 ps ($\Delta z=0$ mm, see FIGS. 3A-3C). FIGS. 5C-5H: The numerically computed and the experimentally measured normalized spectral amplitudes, with the inset plots showing the experimentally measured temporal waveform when the layer-to-layer distances are changed by $\Delta z=-10$ mm (FIG. 5C), $\Delta z=-5$ mm (FIG. 5D), $\Delta z=5$ mm (FIG. 5E), $\Delta z=10$ mm (FIG. 5F), $\Delta z=15$ mm (FIG. 5G) and $\Delta z=20$ mm (FIG. 5H). The negative (positive) sign indicates that the inter-layer axial distances decrease (increase).

FIG. 6A: The temporal and spectral output distributions (in dashed box), synthesized by the original design that was trained to generate a 15.50 ps square pulse. FIG. 6B: Replacing the last diffractive layer with another, newly trained diffractive layer to synthesize a 12.03 ps square pulse at the output. The thickness profile of the newly trained diffractive layer is shown together with the normalized spectral and temporal amplitudes synthesized by this new diffractive network in dashed box of FIG. 6B. FIG. 6C: Replacing the last two diffractive layers with newly trained, two diffractive layers to synthesize a 12.03 ps square pulse at the output. The thickness profiles of the newly trained diffractive layers are shown together with the normalized spectral and temporal amplitudes synthesized by this new diffractive network in dashed box of FIG. 6C.

FIGS. 7A-7C illustrate the pulse shaping diffractive network design and output results. FIG. 7A shows the thickness profiles of the resulting diffractive layers after deep learning-based training in a computer. These diffractive layers can synthesize a square pulse with a width of 10.96 ps over the output aperture for an input pulse shown in FIG. 7B. FIG. 7B shows the normalized amplitude of the input terahertz pulse measured right after the input aperture; in time-domain (left) and spectral domain (right). The arrows on the measured spectral amplitude profile represent the water absorption bands at terahertz frequencies. FIG. 7C: Left: Amplitude of the numerically computed (top) and experimentally measured (bottom) pulses in time domain. Top right: The normalized spectral amplitudes corresponding to the numerically computed and experimentally measured pulses. Bottom right: Unwrapped spectral phase distributions computed based on the numerical forward model and experimentally measured pulse.

FIG. 8A: Input terahertz pulses impinging upon the diffractive network. Dashed line represents the pulses that have been used in the training phase and solid line represents the actual experimental input terahertz pulse. FIG. 8B: Normalized spectral amplitude of the input terahertz pulses in FIG. 8A. FIG. 8C: From left to right, normalized output spectral amplitude of the obtained pulse at the end of numerical training, from the experiment and after normalization, numerical training output field, experimental output field and normalized output field of square pulses resulting from deep learning-based training in a computer for synthesizing the desired (ground truth) square pulses with pulse-widths of 15.49 ps (FIG. 8A), and 10.52 ps (FIG. 8B).

FIG. 9A: The thickness profiles of the resulting diffractive layers after deep learning-based training in a computer. These diffractive layers can synthesize a square pulse with a width of 15.56 ps over the output aperture for an input pulse shown in FIG. 9B. FIG. 9B: Normalized amplitude of the input terahertz pulse measured right after the input aperture; in time-domain (left) and spectral domain (right). The arrows on the measured spectral amplitude profile represent the water absorption bands at terahertz frequencies. FIG. 9C: Left: Normalized amplitude of the numerically computed (top) and experimentally measured (bottom) pulses in time domain. Top right: The normalized spectral amplitudes corresponding to the numerically computed and experimentally measured pulses. Bottom right: Unwrapped spectral phase distributions computed based on numerical forward model and experimentally measured pulse. Arrow on the phase profile illustrates a small discrepancy between the numerical and experimental results due to the water absorption bands at THz frequencies.

DETAILED DESCRIPTION OF ILLUSTRATED EMBODIMENTS

Figure 1A:
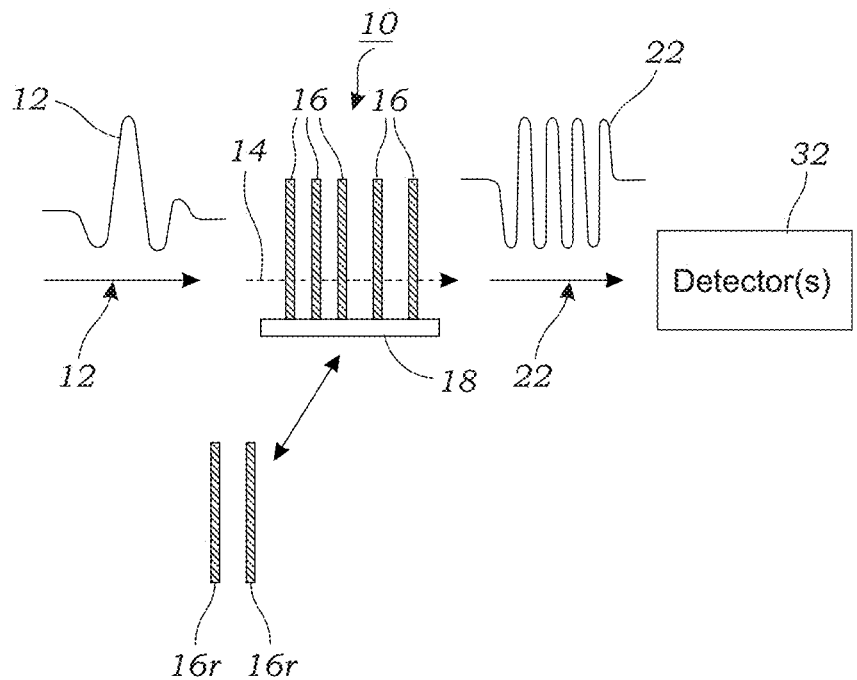
FIG. 1A schematically illustrates one embodiment of diffractive network device operating in a transmission mode.
Figure 1B:
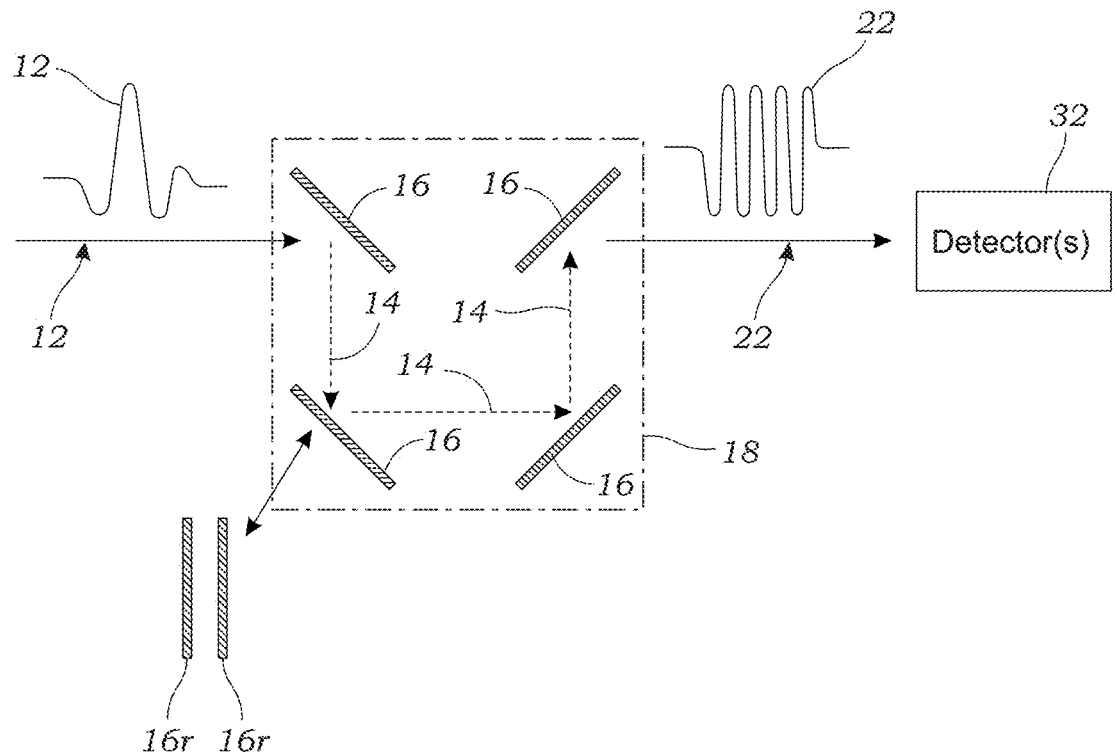
FIG. 1B schematically illustrates one embodiment of diffractive network device operating in a reflection mode.

FIGS. 1A and 1B schematically illustrate embodiments of diffractive network devices 10 according to various embodiments. FIG. 1A illustrates a diffractive network device 10 that operates in transmission mode. FIG. 1B illustrates a diffractive network device 10 that operates in reflection mode. The diffractive network devices 10 described herein may be used for altering a shape or profile of an input optical pulse or waveform 12. The input optical pulse or waveform 12 may, in some embodiments, be a terahertz pulse of electromagnetic radiation or light. In other embodiments, the input optical pulse or waveform 12 may include visible electromagnetic radiation or light (e.g., light with a wavelength in the range of about 380 nm to about 740 nm) as well as radiation or light outside the perception range of humans.

The diffractive optical neural network device 10 includes a plurality of optically transmissive and/or reflective layers 16 arranged in one or more optical paths. FIG. 1A illustrates a single optical path 14 through the plurality of optically transmissive layers 16 while FIG. 1B illustrates separate optical paths 14 that result from reflection off the plurality of optically reflective layers 16. As explained herein, the diffractive optical neural network device 10 may operate in a transmission mode like that of FIG. 1A, a reflection mode like that of FIG. 1B, or a combination of transmission and reflection modes. These layers 16 act as modular diffractive elements that can be inserted/removed into the optical path(s) 14 to alter the shape or waveform profile of the input optical pulse or waveform 12. In one embodiment, at least one of the layers 16 is removable from the diffractive network 10. In other embodiments, a plurality of such layers 16 or even all layers 16 may be removable from the diffractive network 10 and replaced with replacement layers 16r (seen in FIGS. 1A, 1B). The layers 16 are formed as a physical substrate or matrix of optically transmissive material (for transmission mode) or optically reflective material (for reflective mode). Combinations of optically transmissive and optically reflective layers 16 may also be used. FIG. 1A illustrates layers 16 in transmission mode where light or optical radiation transmits and diffracts through the layers 16. FIG. 1B illustrates layers 16 in reflection mode where light or optical radiation reflects off/from the layers 16. Exemplary materials that may be used for the layers 16 include polymers and plastics (e.g., those used in additive manufacturing techniques such as 3D printing) as well as semiconductor-based materials (e.g., silicon and oxides thereof, gallium arsenide and oxides thereof), crystalline materials or amorphous materials such as glass and combinations of the same. In some embodiments, one or more layers 16 of the diffractive network may comprise reconfigurable features such as, for example, spatial light modulators (SLMs). That is to say the layer(s) 16 of the optical network 10 may include reconfigurable "neurons" using, for instance, SLMs.

Figure 2A:
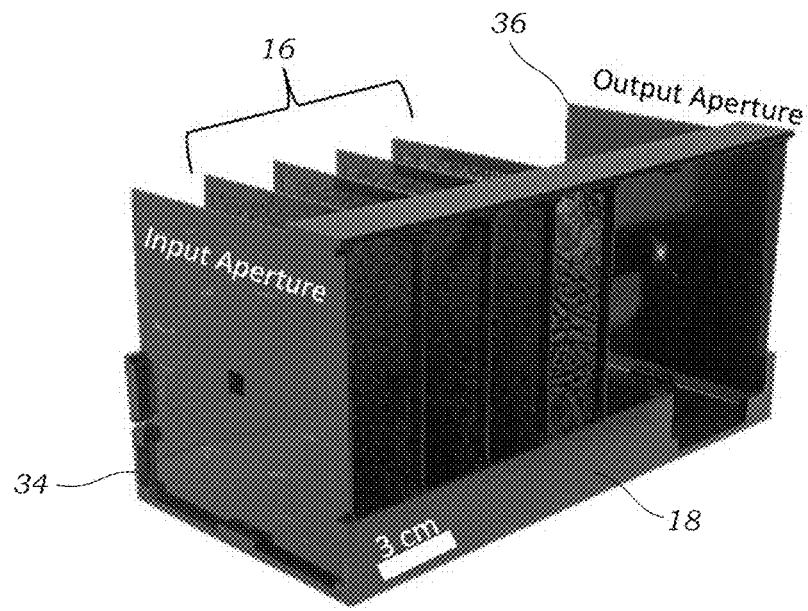
FIGS. 2A-2D illustrate a schematic of the pulse shaping diffractive network and a photo of the experimental setup.

The pulse of light or optical radiation that forms the input optical pulse or waveform 12 is directed through diffractive network device 10 along an optical path 14 (or in other embodiments along multiple optical paths 14). The layers 16 are held within a holder 18 as seen in FIGS. 1A and 2A that maintain the various layers 16 in a permanently or temporarily fixed state whereby the various layers 16 are separated from one another. The actual number of layers 16 that collectively define the diffractive network device 10 may vary but is typically two (2) or more and less than ten (10), but may vary. As stated above, in some embodiments, the spacing between the layers 16 may be adjusted or altered. For example, the holder 18 may allow layers 16 to move along the direction of the optical path 14 to adjust the relative distances between the layers 16 (e.g., the layers 16 may be located closer to adjacent layers 16 or further away from layers 16). Each layer 16, for instance, could be held within a respective mount, or the like that can slide or move laterally within the holder 18 which can adjust the distance(s) between the layers 16. Fasteners may be used to temporarily secure the layers 16 once in place in the desired location and can be loosened to remove and/or adjust the spacing the layers 16. These could be screws, clasps, or other typical fasteners. For example, both FIGS. 1A and 1B illustrate replacement layers 16r that can be used to replace or swap with existing layers 16 in the diffractive network device 10. Thus, the diffractive network device 10 is modular in that individual layers 16 or groups of layers 16 can be removed/added to tune the performance of the diffractive network device 10. The layers 16, 16r provide physical modularity to the diffractive network device 10. Different layers 16, 16r can be swapped in/out of the diffractive network device 10 to achieve the desired output pulse shape or waveform profile 22.

Figure 1C:
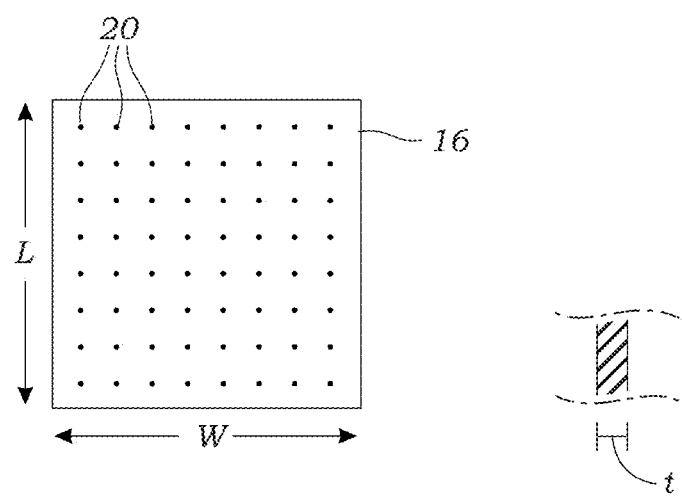
FIG. 1C illustrates a single optically transmissive and/or reflective layer that is used as part of a diffractive network device.

Each layer 16, 16r of the diffractive network device 10 has a plurality of physical features 20 (FIG. 1C) formed on the surface of the layer 16, 16r or within the layer 16, 16r itself that collectively define a pattern of physical locations along the length and width of each layer 16, 16r that have varied complex-valued transmission coefficients (or varied complex-valued transmission reflection coefficients). The physical features 20 formed on or in the layers 16, 16r thus create a pattern of physical locations on or within the layers 16, 16r that have different complex-valued transmission coefficients as a function of lateral coordinates (e.g., length and width and in some embodiments depth) across each layer 16, 16r. In some embodiments, each separate physical feature 20 may define a discrete physical location on the layer 16, 16r while in other embodiments, multiple physical features 20 may combine or collectively define a physical region with a particular complex-valued transmission coefficient. The plurality of layers 16, 16r arranged along the optical path 14 collectively define a desired output pulse shape or waveform profile 22 created by optical diffraction/reflection through/off the plurality of optically transmissive and/or reflective layers 16. The pattern of physical locations formed by the physical features 20 may define, in some embodiments, an array located across the surface of the layer 16. Additional details regarding the layers 16, 16r and physical features 20 that are formed thereon may be found in International Patent Application Publication No. WO 2019/200289, which is incorporated herein by reference.

It should be appreciated that in addition to the layers 16, 16r being used to modify the temporal aspect of the input optical pulse or waveform 12, the layers 16, 16r may be used for spatially altering the output pulse or waveform 22. For example, the layers 16, 16r may be used to alter the input optical pulse or waveform 12 to various spatial shapes or profiles. These include, by way of illustration and not limitation, outputting a pulse or waveform 33 that is planar, spherical, Gaussian or Gaussian-like. The layers 16, 16r may be used to modify the input optical pulse or waveform 12 temporally and/or spatially.

In yet another embodiment, the layers 16, 16r may be used to reshape or alter an input optical pulse or waveform 12 into multiple output pulses or waveforms 22. For example, a single input optical pulse or waveform 12 may pass through the layers 16, 16r and create multiple (e.g., three) different output pulses or waveforms 22. In this embodiment, multiple optical detectors 32 may be used to capture each respective output pulse or waveform 22.

In still another embodiment, the layers 16, 16r may be used to correct or compensate for pulse dispersion. When light travels through a medium it often undergoes undesirous dispersion (i.e., the pulse width increases). The counteract this, the layers 16, 16r may be used to temporally compress the input optical pulse or waveform 12 to correct or compensate for pulse dispersion. This is done to the input pulses or waveforms 12 in the time-domain through phase compensation. Conversely, the output pulse or waveform 22 may be temporally expanded relative to the input optical pulse or waveform 12.

The layer 16, 16r in one embodiment is a two-dimensional generally planer substrate having a length (L), width (W), and thickness (t) that all may vary depending on the particular application. In other embodiments, the layer 16, 16r may be non-planer such as, for example, curved. The physical features 20 and the physical regions formed thereby act as artificial "neurons" that connect to other "neurons" of other layers 16, 16r of the diffractive network device 10 through optical diffraction (or reflection) and alter the phase and/or amplitude of the light wave. The particular number and density of the physical features 20 and the artificial neurons that are formed thereby in each layer 16, 16r may vary depending on the type of application. In some embodiments, the total number of artificial neurons may only need to be in the hundreds or thousands while in other embodiments, hundreds of thousands or millions of neurons or more may be used. Likewise, the number of layers 16, 16r that are used in a particular diffractive network device 10 may vary although it typically ranges from at least two (2) layers 16 to less than ten (10) layers 16.

The output pulse or waveform 22 is optionally captured by one or more optical detectors 32. The optical detectors 32 may include, for example, photodetectors (e.g., photodiode such as avalanche photodiode detector (APD)), photomultiplier (PMT) devices, multiple image sensors, and the like. The optical detector(s) 32 may also include individual pixels or a collection of pixels found in in CCD or CMOS image sensors or the entire image sensor itself. The output pulse or waveform 22 may also be transmitted using conventional optical components (e.g., lenses, optical fibers).

With reference to FIGS. 2A-2C, 6A-6C, 11A-11C, 12A-12C, the input optical pulse or waveform 12 may pass through an input aperture 34 prior to encountering the layers 16. Likewise, an output aperture 36 may be interposed between the last layer 16 in the optical path 14 and the one or more detectors 32. The input aperture 34 and the output aperture 36, however, may be omitted in other embodiments.

Figure 1D:
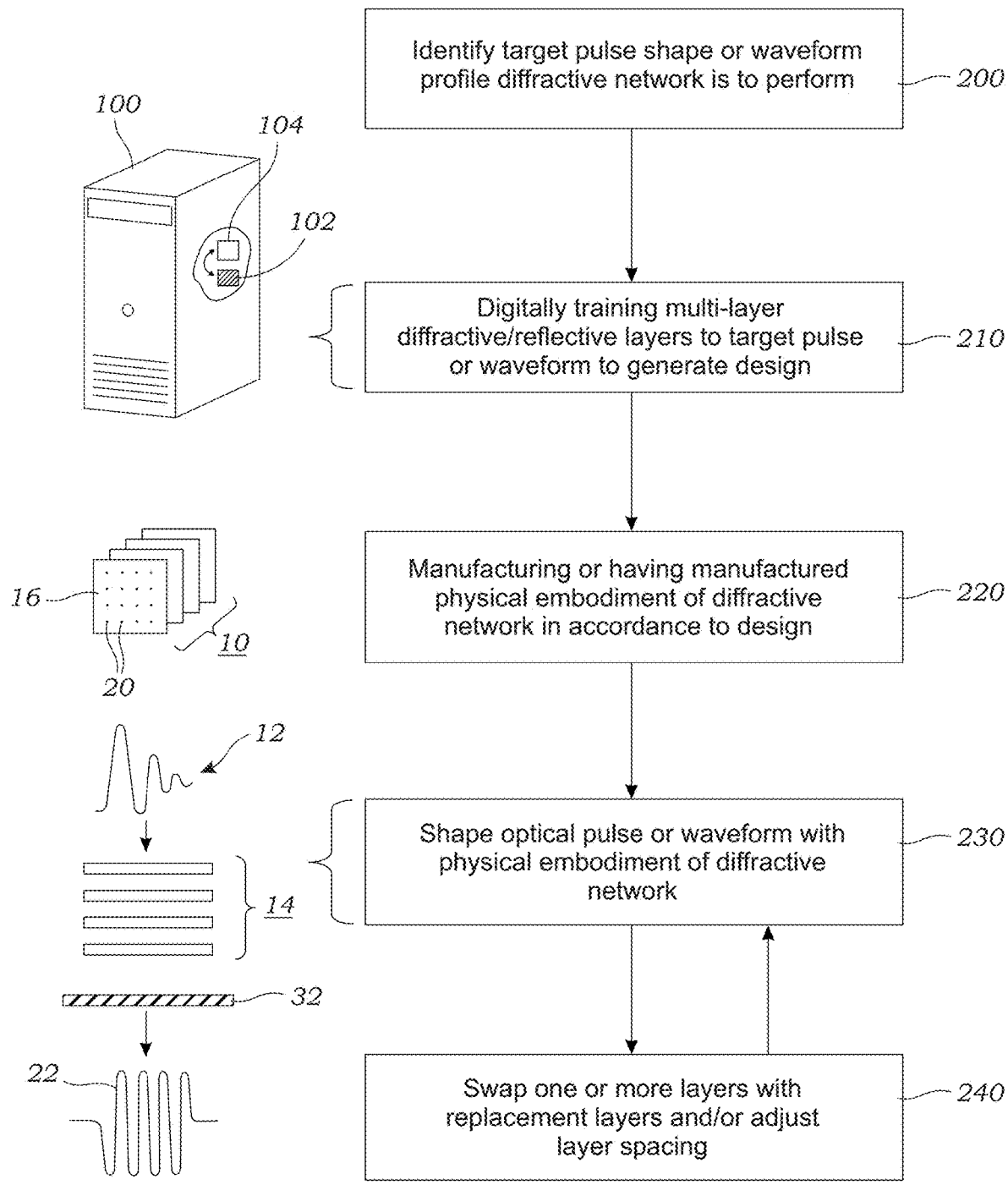
FIG. 1D illustrates a flowchart of operations used to design and use a diffractive network device according to one embodiment.

FIG. 1D illustrates a flowchart of the operations or processes, according to one embodiment, to create and use the diffractive network device 10. As seen in operation 200 of FIG. 1D, a specific desired/target pulse shape or waveform profile is first identified that the diffractive network device 10 will perform. As one illustrative example, this includes generating a square wave but other target pulse shapes or waveforms are contemplated. Once the pulse shape or waveform profile has been established, a computing device 100 having one or more processors 102 executes software 104 thereon to then digitally train a digital model or mathematical representation of multi-layer diffractive or reflective layers 16 to create the desired/target pulse shape or waveform profile to then generate a design for a physical embodiment of the diffractive network device 10. This operation is illustrated as operation 210 in FIG. 1D. The design includes the physical layout for the different physical features 20 that form the artificial neurons in each of the plurality of layers 16 which are present in the diffractive network device 10 may then be used to make a physical embodiment that reflects the computer-derived design. Operation 220 reflects that the now generated design is used to manufacture or have manufactured the physical embodiment of the diffractive network device 10 in accordance with the design. The design, in some embodiments, may be embodied in a software format (e.g., SolidWorks, AutoCAD, Inventor, or other computer-aided design (CAD) program or lithographic software program) may then be manufactured into a physical embodiment that includes the plurality of layers 16. The physical layers 16, once manufactured may be mounted or disposed in a holder 18 such as that illustrated in FIG. 1A. The holder 18 may include a mount or the like which is used to hold the layers 16 in the required sequence and with the required spacing between adjacent layers (if needed). The mount may include a slot or receiving region into which the layers 16 are positioned. The mount may be adjustable along the length of the holder using slides, fasteners, or the like. In this way, the spacing between the layers 16 may be adjusted. The layers 16 may also be contained in a housing (not shown) around all or a portion of the periphery that are designed to be easily loaded and removed from the holder 18. The layers 16 may thus be modular units that can be swapped in and out the holder 18. The holder 18 may also take the form of an electronic device such as a camera or the like in certain embodiments. In this regard, the layers 16 may swapped or changed like lenses in a conventional SLR cameras. Once the physical embodiment of the diffractive network device 10 has been made, the diffractive network device 10 is then used to shape the input optical pulse or waveform 12 as illustrated in operation 230 of FIG. 1D.

In some embodiments, one or more layers 16 may be optionally swapped or exchanged with replacement layers 16r to fine-tune or adjust the output pulse shape or waveform profile 22. Similarly, the interspacing distance between one or more layers 16 may be adjusted to fine-tune or adjust the output pulse shape or waveform profile 22. This may include expansion or compression of the pulse shape or waveform profile. These operations are illustrated in operation 240 of FIG. 1D.

Experimental

Results

Figure 2B:
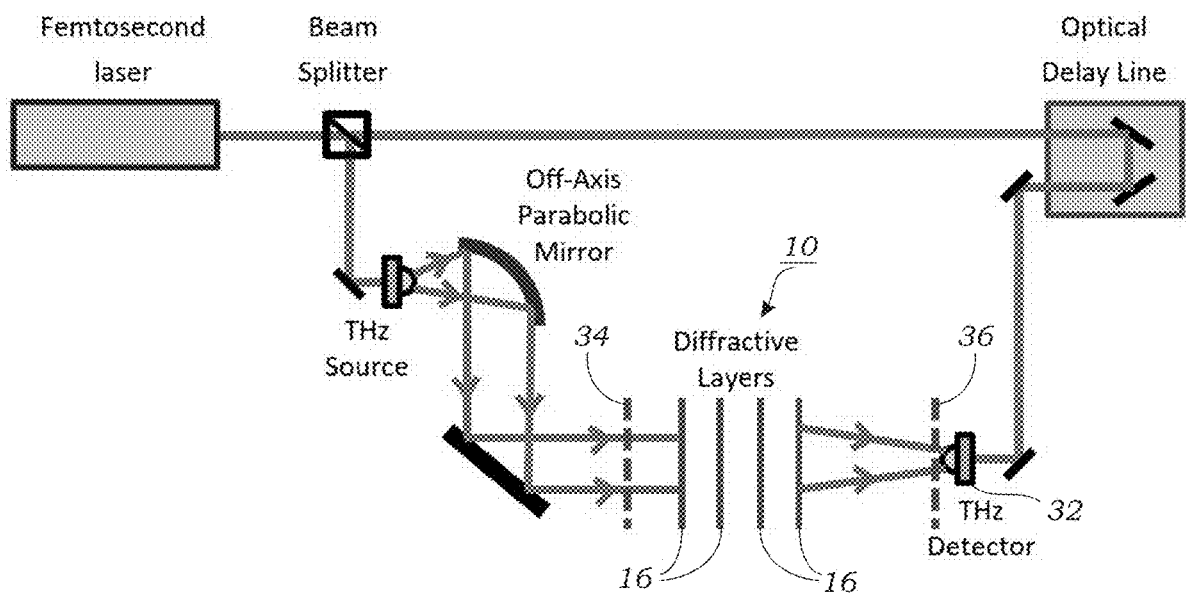
Figure 2C:
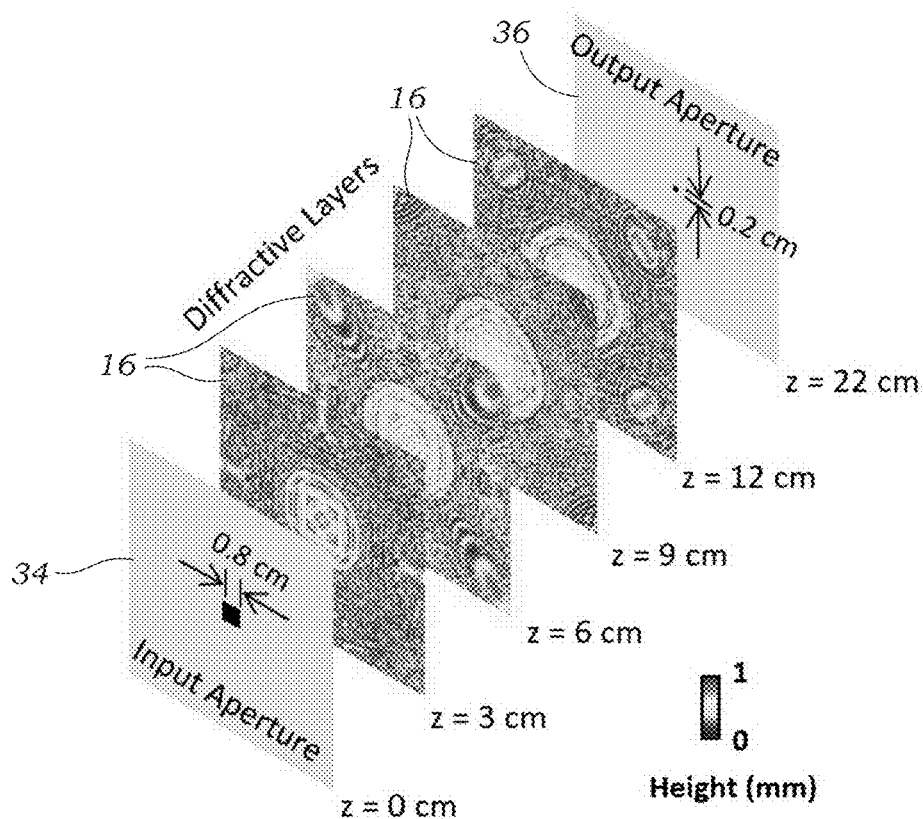
Figure 2D:
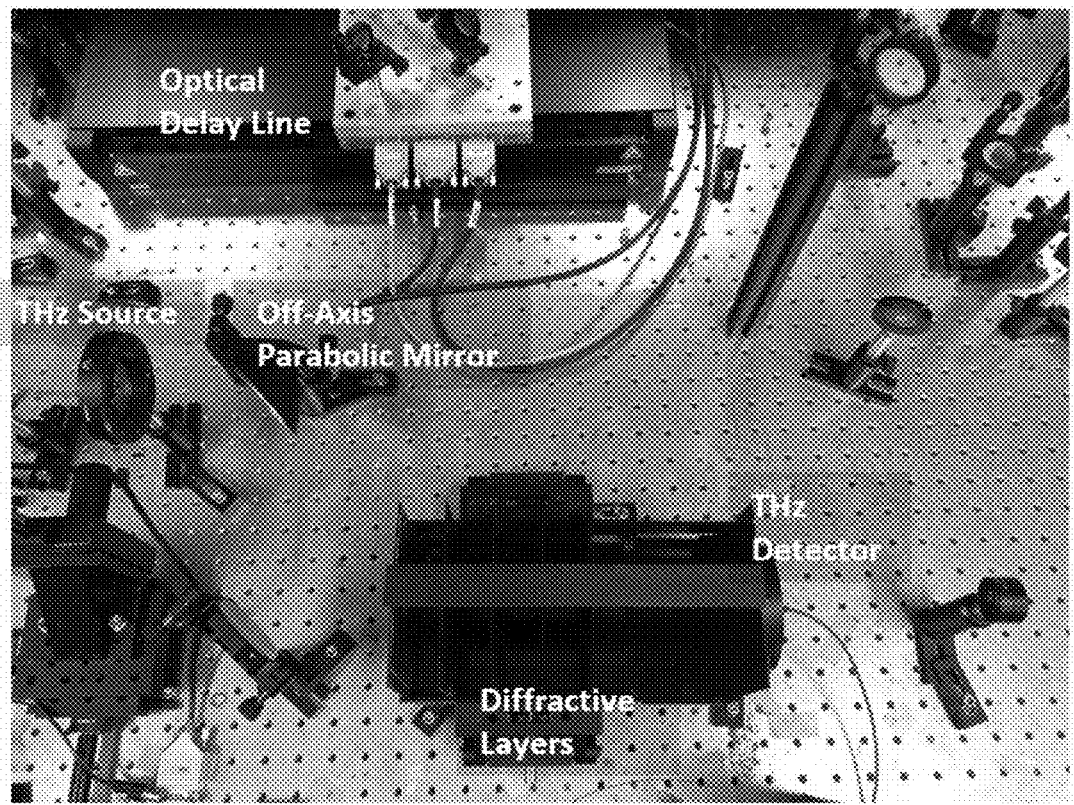

Synthesis of arbitrary temporal waveforms through small footprint and compact systems has been of great interest for various applications in e.g., tele-communications, ultra-fast imaging and spectroscopy, and it represents a challenging inverse design problem. Specifically, it requires accurate control of the complex-valued weights of the spectral components across a wide bandwidth and with high spectral resolution. This challenging inverse design problem was addressed through the training of a diffractive network 10 as shown in FIG. 2C. The forward training model of the diffractive network 10 formulates the broadband light propagation using the angular spectrum representation of optical waves. Based on the complex dispersion information of a diffractive material, the thickness of each diffractive feature (i.e., 'neuron') of a given diffractive layer 16 is iteratively trained and optimized through the error-backpropagation with respect to a target cost function (further described in Methods section herein). After the convergence of this deep learning-based training in a computing device 100 that is digitally trained and generates a target design, the resulting diffractive layers 16 (FIGS. 2A, 2C) were fabricated using a 3D-printer to physically form the pulse shaping network 10 as shown in FIG. 2C. This diffractive network 10 was then experimentally tested for its desired/targeted pulse shaping capability using a terahertz time-domain spectroscopy (THz-TDS) setup that provides a noise equivalent bandwidth of 0.1-5 THz (FIGS. 2B, 2D).

Figure 3A:
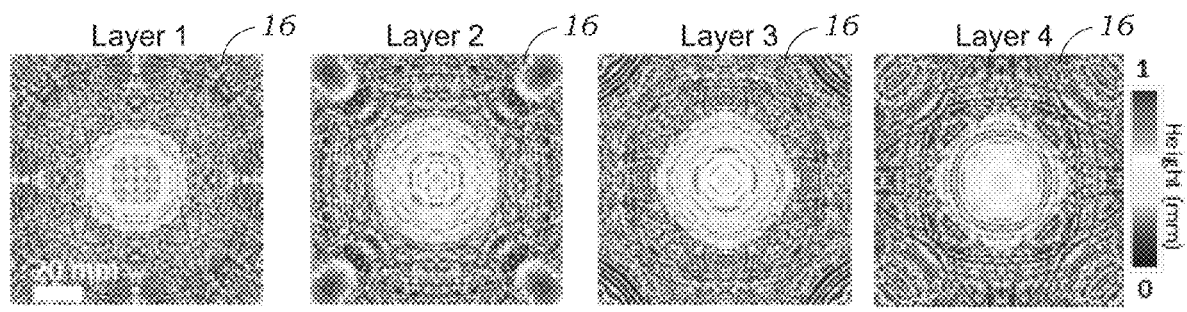
FIGS. 3A-3C show the pulse shaping diffractive network design and output results.
Figure 3B:
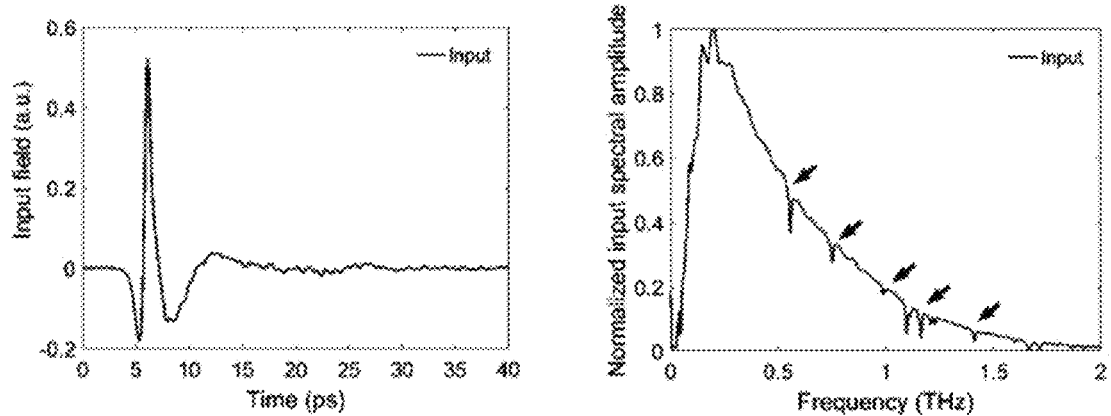
Figure 3C:
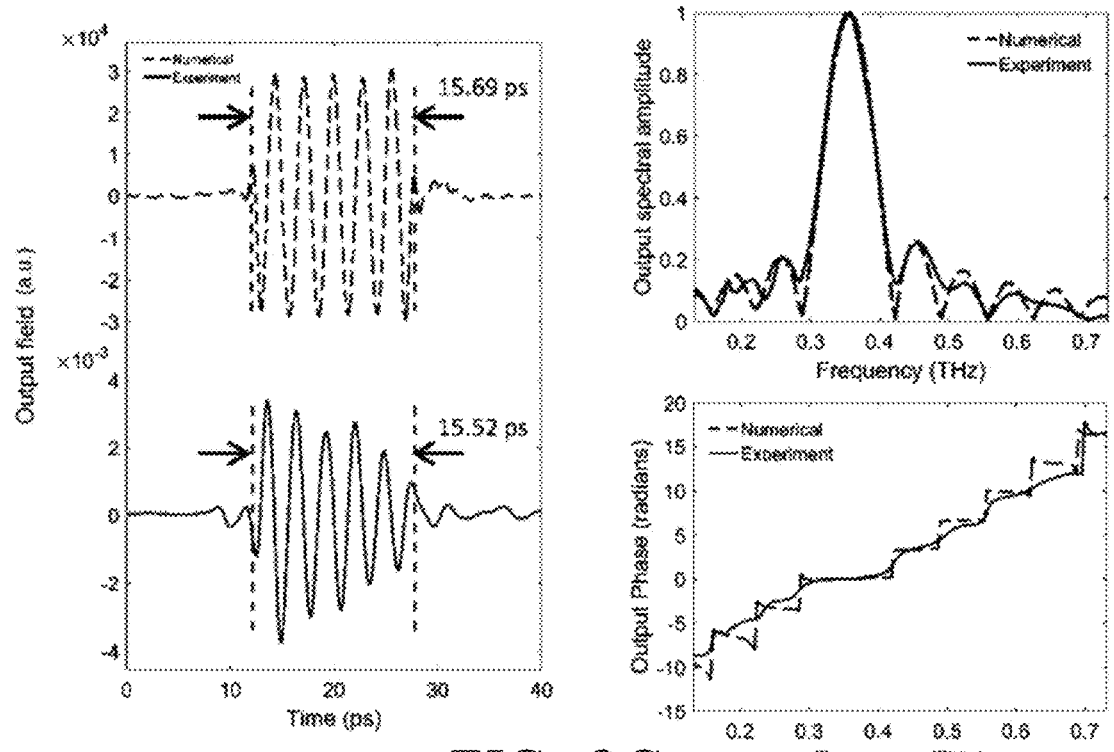

Each one of the pulse shaping diffractive networks 10 that were evaluated consists of four (4) trained layers 16 that process the input terahertz pulse 12 to synthesize a desired output pulse shape or waveform profile 22 (e.g., temporal waveform) over an output aperture of 0.2 cm×0.2 cm. Based on this system layout and a given input pulse 12 profile to be shaped (FIG. 3B), diffractive networks 10 were trained and fabricated that generate square pulses with different temporal widths as the output pulse shape or waveform profile 22. For example, FIG. 3A demonstrates the diffractive layers 16 of a pulse shaping network 10 that was trained to generate a 15.5 ps square pulse 22 by processing the spectrum carried by the input terahertz pulse. FIG. 3C demonstrates the time-domain amplitude of the output waveform numerically computed (dashed) based on the trained diffractive layers 16 and the corresponding experimentally measured output pulse shape or waveform profile 22 (e.g., temporal waveform) (sold), along with the associated spectral amplitude and phase distributions. The carrier frequency of the desired output pulse shape or waveform profile 22 at the output was a non-learnable, predetermined parameter set to be 0.35 THz to avoid water absorption bands in the terahertz regime (depicted by the arrows in FIG. 3B). The numerically predicted output waveform (dashed) in FIG. 3C indicates that a 4-layer diffractive network 10 can synthesize a square temporal waveform with a pulse width of 15.69 ps without using any conventional optical components, in a compact architecture that spans approximately 250-times the carrier wavelength in the axial direction. The pulse width of the output pulse shape or waveform profile 22 created by the 3D printed diffractive layers 16 of the diffractive network 10 at the output aperture is measured as 15.52 ps, closely matching the numerically predicted result (15.69 ps). Similarly, a comparison of the output spectral amplitude profiles for the numerical and experimental results shows a good agreement in terms of the peak locations of the main and side lobes as well as the relative amplitude carried by each spectral component. On the other hand, an examination of the unwrapped phase profiles (experimental vs. numerical) reveals that the 3D-fabricated, physical diffractive network 10 could not exactly create the sharp phase transitions at the expected spectral locations, but rather generated smoothened transitions. This smoothening contributes to some of the differences observed between the experimentally measured and the numerically calculated time-domain waveforms (FIG. 3C). The power efficiency of this diffractive network 10 was experimentally measured as ~0.51% at the carrier frequency ($f_0$=355 GHz), quantified at the output aperture 36, normalized with respect to the input; here it should be emphasized that >70% of the input optical power at the carrier frequency is in fact lost due to absorption within the 3D printed diffractive layers 16. Therefore, to create the diffractive layers 16, the selection of a different fabrication material with a much lower loss (e.g., polymers such as poly-methylpentene: TPX) can significantly boost the overall efficiency of these diffractive pulse shaping networks 10. Other strategies to improve the power efficiency include increasing the output aperture 36 size and as introducing additional power-related penalty terms during the training phase of the diffractive network 10.

FIGS. 7A-7C further illustrate another diffractive network 10 that was designed to create a narrower square pulse as the output pulse shape or waveform profile 22 at its output aperture. At the end of its deep learning-based training, the numerical forward model converged to the thickness profiles for the layers 16 as shown in FIG. 7A in order to synthesize a 10.96 ps square pulse (dashed) illustrated in FIG. 7C. When the diffractive layers 16 depicted in FIG. 7A were 3D printed and tested using the setup shown in FIG. 2D, the output pulse shape or waveform profile 22 was measured to have a temporal width of 11.85 ps (solid curve in FIG. 7C), providing a good match to the numerical results, similar to the conclusions reported in FIGS. 3B and 3C.

Figure 8B:
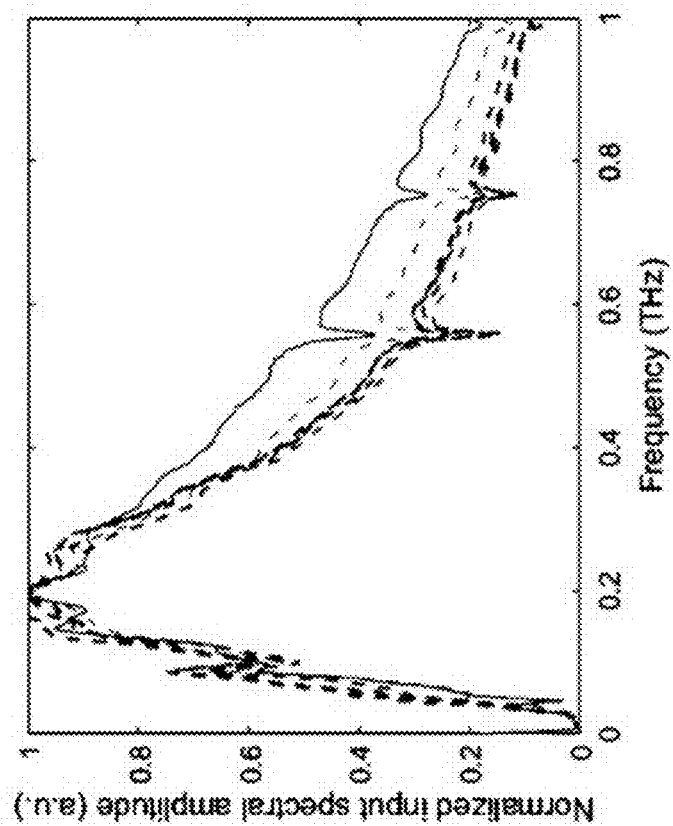
FIGS. 8A-8D illustrate the normalization of the output pulse.
Figure 8A:
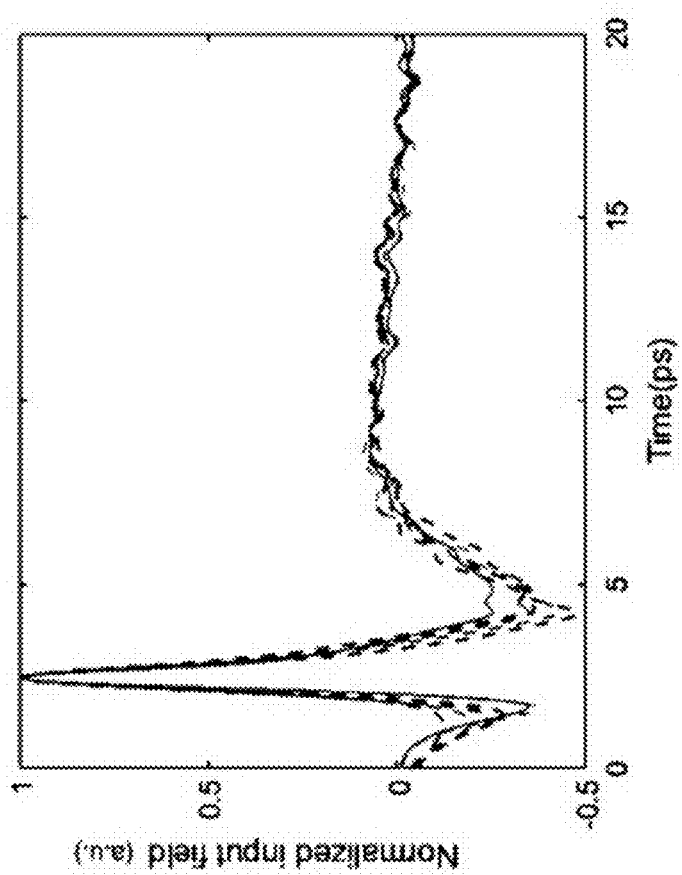

Beyond fabrication artifacts and misalignments observed in the 3D-printed diffractive networks 10, the variation of the input terahertz pulse 12 from experiment to experiment is one of the significant contributors for any mismatch between the numerical and experimental output waveforms 22. The deep learning-based design of the diffractive networks 10 shown in FIGS. 3A-3C and 7A-7C relies on a known input terahertz pulse profile that is experimentally measured over the input aperture. To be able to take into account uncontrolled variations of the input pulse profile 12 from run to run, five (5) different experimentally measured input pulse profiles 12 were used (dashed curves in FIGS. 8A, 8B) during the training phase of each diffractive network 10. In the experimental testing phase, however, the terahertz input pulse 12 (normalized solid line in FIGS. 8A, 8B) slightly deviated from these input pulse profiles 12 used in the training, causing some distortions in the experimental measurements shown in FIGS. 3A-3C and 7A-7C, compared to their numerically computed counterparts for the same diffractive network models.

Figure 8C:
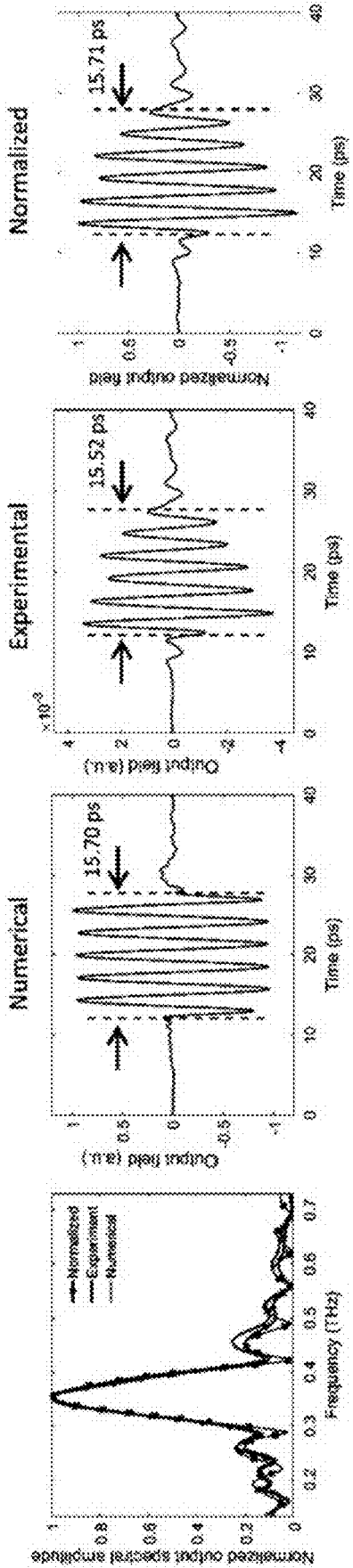
Figure 8D:
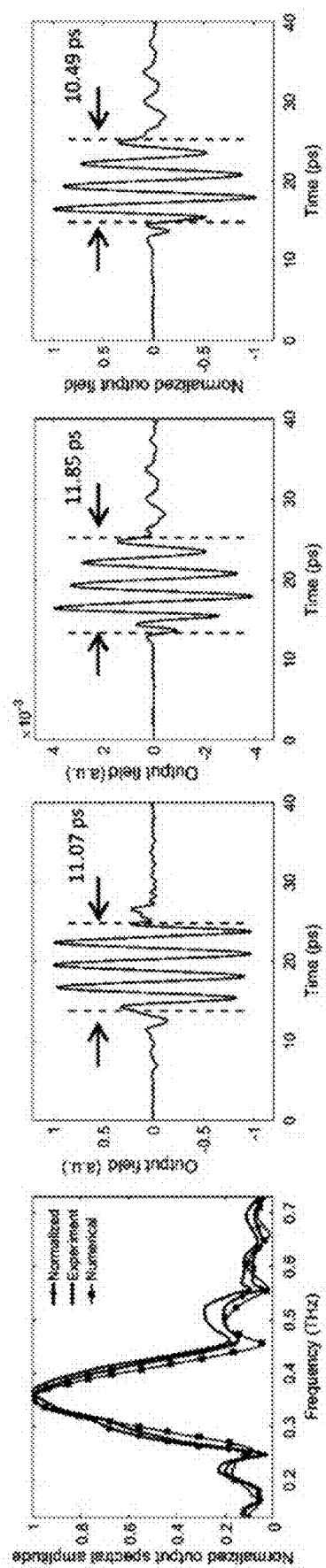

To shed more light onto this, next the experimentally measured spectral amplitude profiles depicted in FIGS. 3C and 7C were normalized, based on the ratio between the average spectral amplitudes carried by the input pulses 12 used in the training phase and the input pulse 12 measured at the experimental testing phase. This spectral normalization procedure nullifies the effect of input terahertz source variations from experiment to experiment and provides an opportunity to better evaluate the accuracy of the complex-valued spectral filtering operation performed by the 3D-fabricated diffractive networks 10. FIGS. 8C and 8D demonstrate the experimental spectral amplitudes and the corresponding output pulse shape or waveform profile 22 at the network output before and after this spectral normalization step for the diffractive networks 10 shown in FIGS. 3A and 7A, respectively. Following the spectral normalization, the width of the square pulse created by the diffractive network in FIG. 7A, for example, decreased from 11.85 ps to 10.49 ps, providing a better match to 11.07 ps that is predicted by the numerical forward model (FIG. 8D). A similar improvement using spectral normalization was also observed for the diffractive network 10 shown in FIG. 3A, almost perfectly matching its numerical counterpart in terms of square pulse width, achieving 15.71 ps after the normalization step (see FIG. 8C).

Figure 9A:
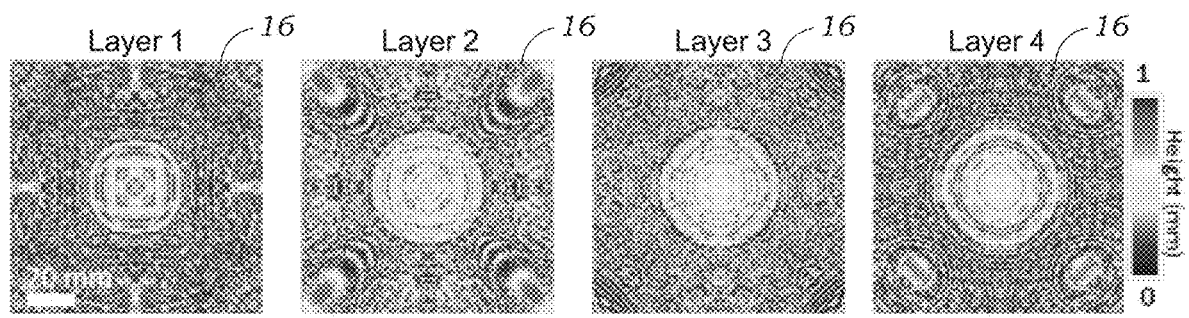
FIGS. 9A-9C illustrate a generic pulse shaping diffractive network design and output results.
Figure 9B:
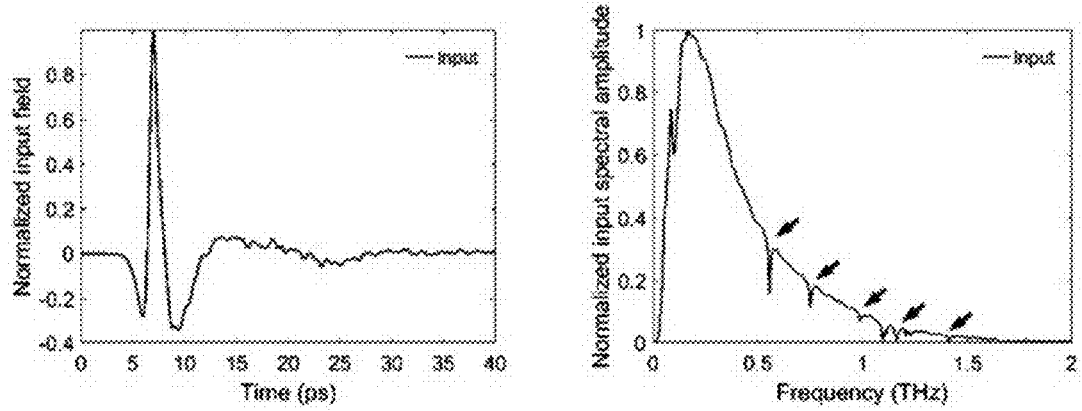
Figure 9C:
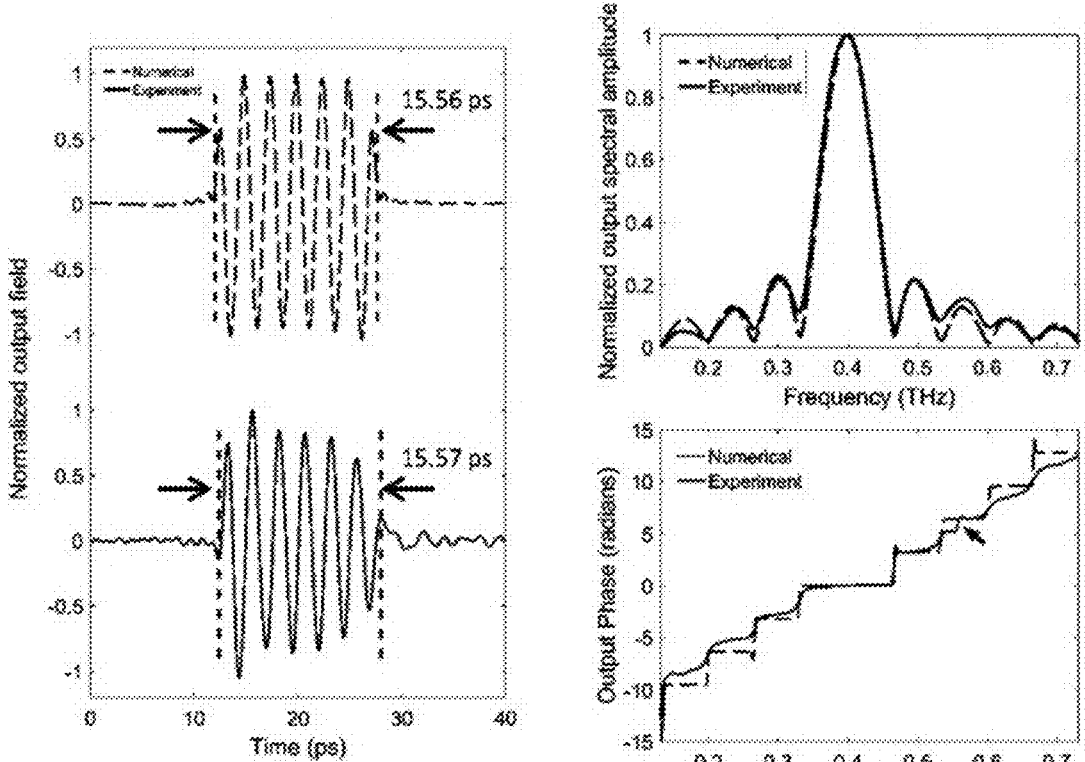

These results highlight that experiment-to-experiment variability of the input terahertz pulse profile 12 causes it to deviate from the input pulse profiles used in the training phase of the diffractive network 10, creating some uncontrolled errors in the output pulse profile 22, which can be improved significantly after the spectral normalization step, as discussed above. To further explore the pulse shaping capabilities of diffractive networks 10, next a set of "generic" diffractive networks 10 were trained that used/assumed a flat input spectrum during their training in order to achieve a desired output waveform; stated differently, a generic diffractive network is trained using an input pulse 12 where all the wavelengths have the same spectral amplitude and phase. To accurately demonstrate the pulse shaping behavior of these generic diffractive designs that were trained with flat spectra, spectral normalization was used based on the input pulse profile 12, experimentally measured at each run. For example, FIG. 9A demonstrates the diffractive layers 16 of a generic pulse shaping network model that was trained to create a 15.5 ps square pulse as the output pulse shape or waveform profile 22. FIG. 9C reports the time-domain amplitude of the output waveform numerically computed (dashed) based on these trained diffractive layers 16 and the experimentally measured output pulse shape or waveform profile 22 (solid) along with the corresponding spectral amplitude and phase distributions. The synthesized pulse shape 22 by the 3D-printed diffractive network 10 closely matches the numerically computed waveform using the forward model, despite the water absorption bands that appear in the experimental results, illustrated by the arrows in FIG. 9B. The power efficiency at the carrier frequency ($f_0$=400 GHz) of this diffractive network 10 was experimentally measured as ~0.97%.

Figure 13A:
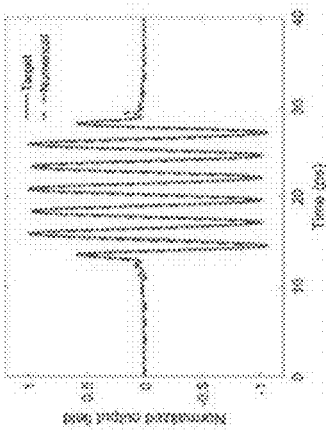
FIGS. 13A-13C illustrate diffractive pulse shaping networks (and power efficiency values) that were trained to generate a 15.5 ps square pulse with output aperture widths of 2 mm (left) and 4 mm (right), with their corresponding loss functions shown in the leftmost column.
Figure 13B:
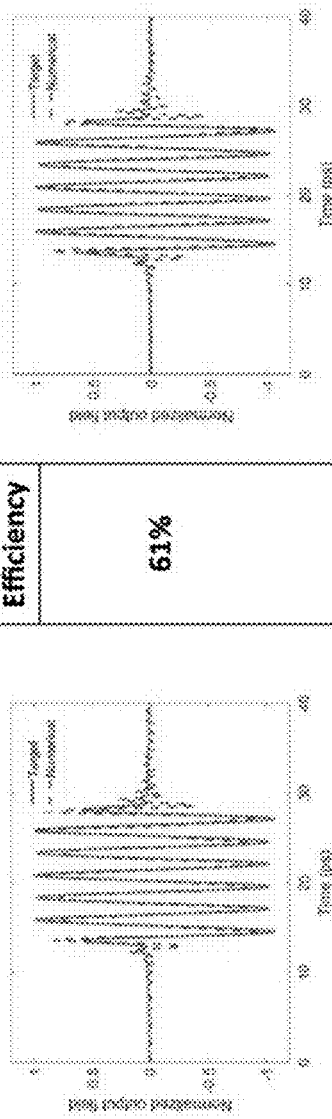
Figure 13C:
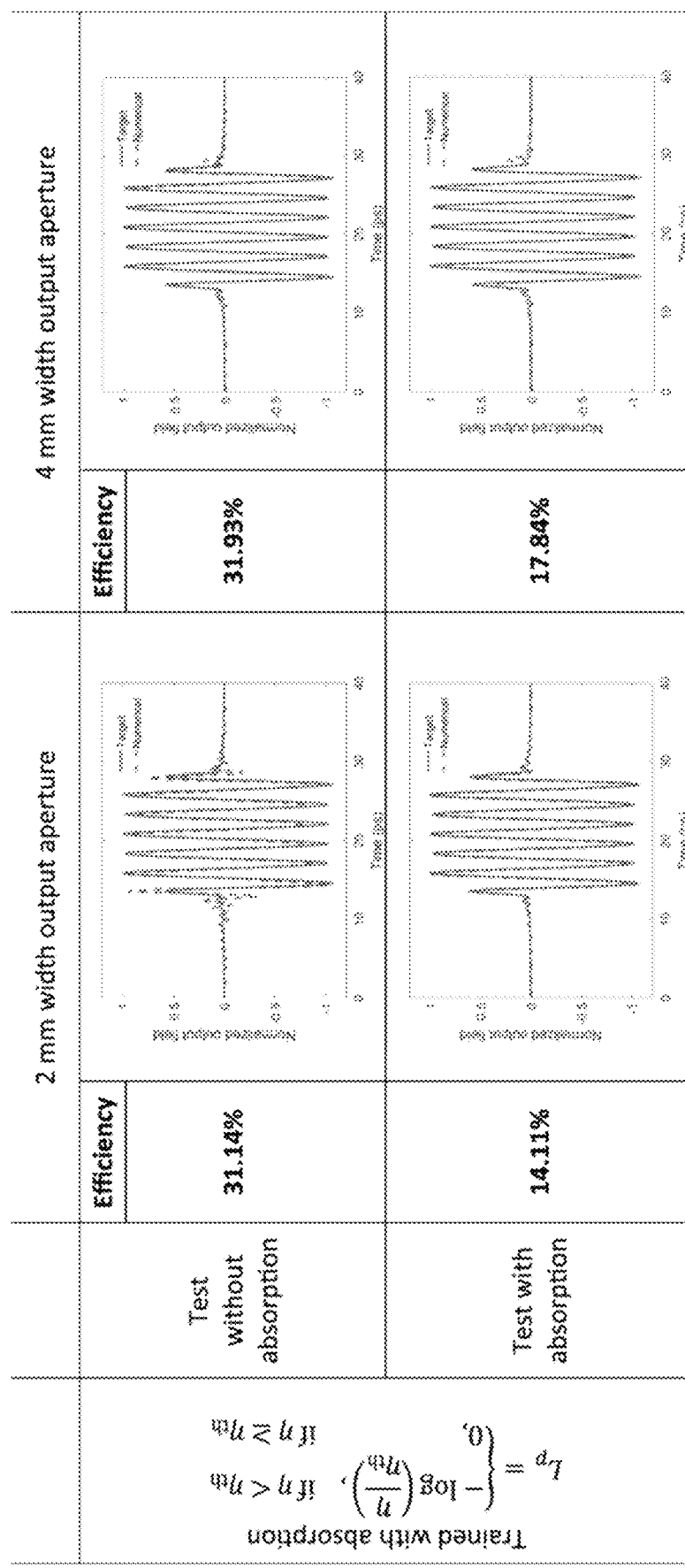
Figure 14A:
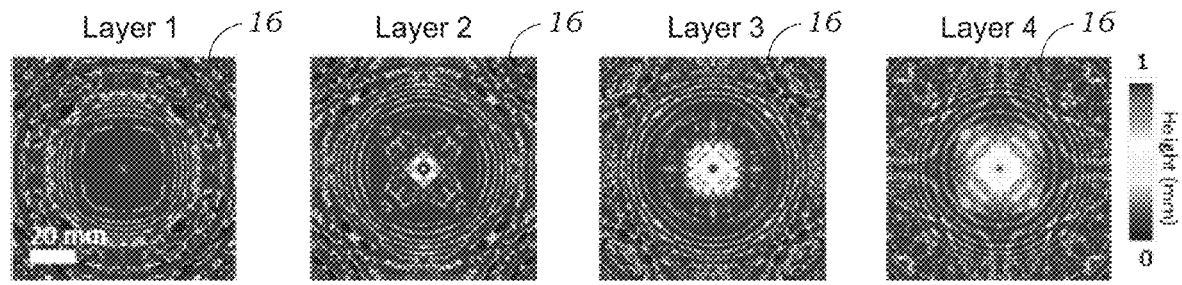
FIG. 14A illustrates the thickness profiles of the resulting diffractive layers of a generic pulse shaping diffractive network design for synthesizing a Gaussian pulse after deep learning-based training in a computer. These diffractive layers synthesize a chirped Gaussian pulse over the output aperture of the diffractive network.
Figure 14B:
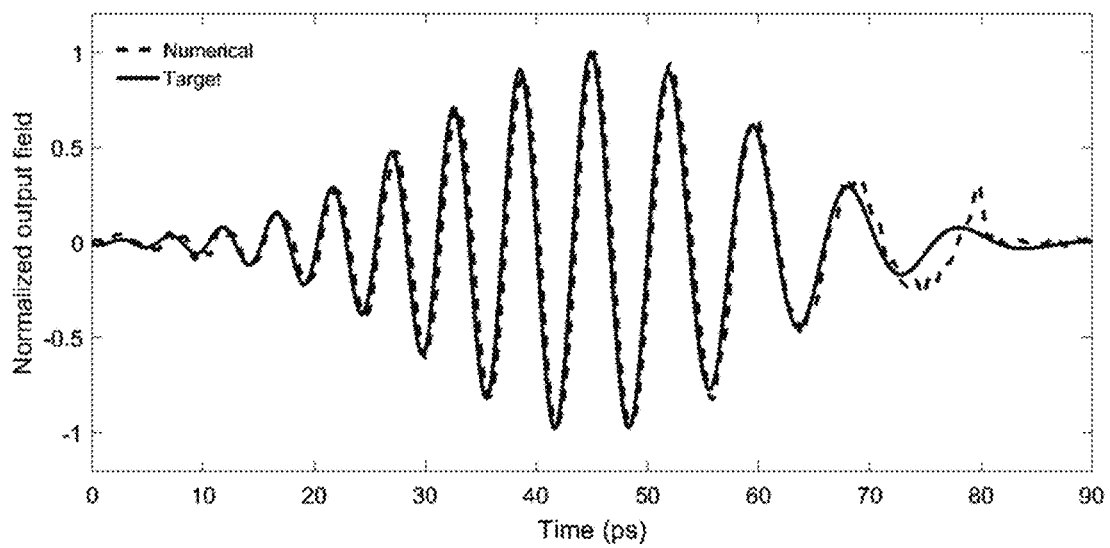
FIG. 14B illustrates the numerically computed (dashed line) and the targeted ground-truth (solid line) output pulses in time domain.
Figure 14C:
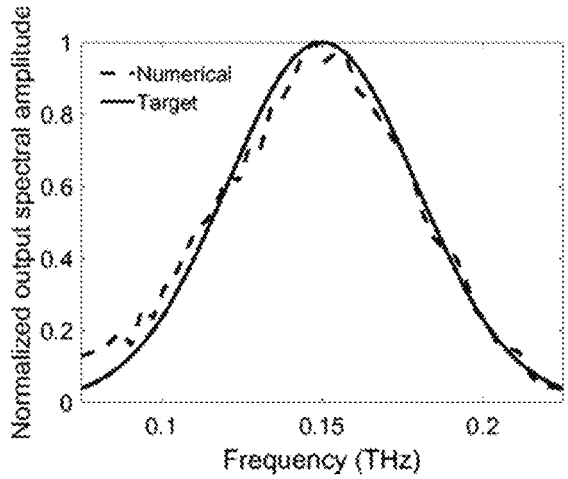
FIG. 14C illustrates the normalized spectral amplitudes corresponding to the numerically computed (dashed) and the target (solid) pulses.
Figure 14D:
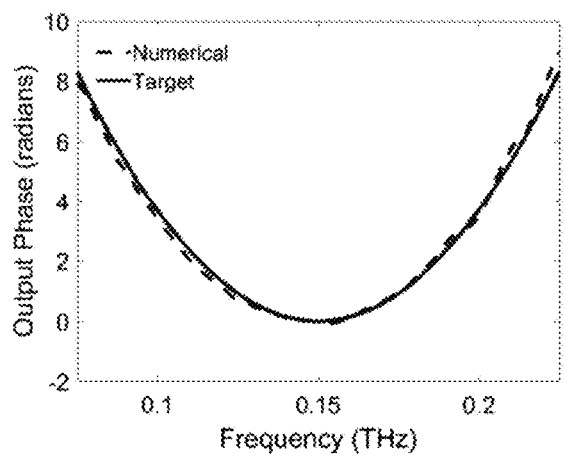
FIG. 14D illustrates the unwrapped spectral phase distributions computed based on the numerical forward model (dashed line) and the target (solid) pulse.
Figure 15A:
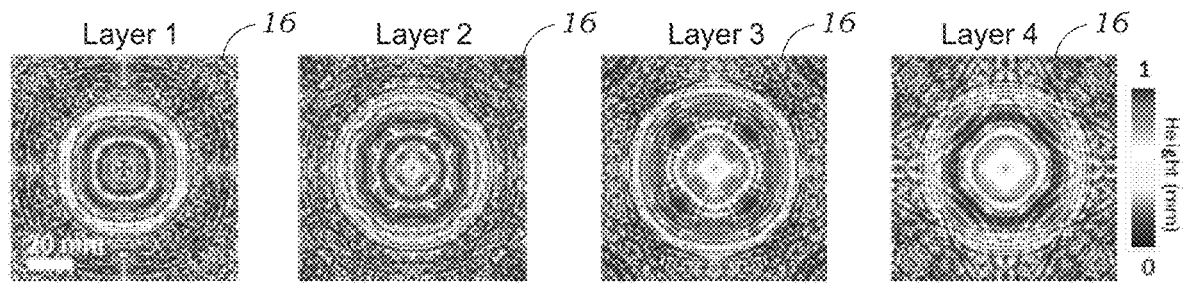
FIG. 15A illustrates the thickness profiles of the resulting diffractive layers of a generic pulse shaping diffractive network design for synthesizing a sequence of positive and negative chirped Gaussian pulse after deep learning-based training in a computer. These diffractive layers synthesize a sequence of positive and negative chirped Gaussian pulses over the output aperture of the diffractive network.
Figure 15B:
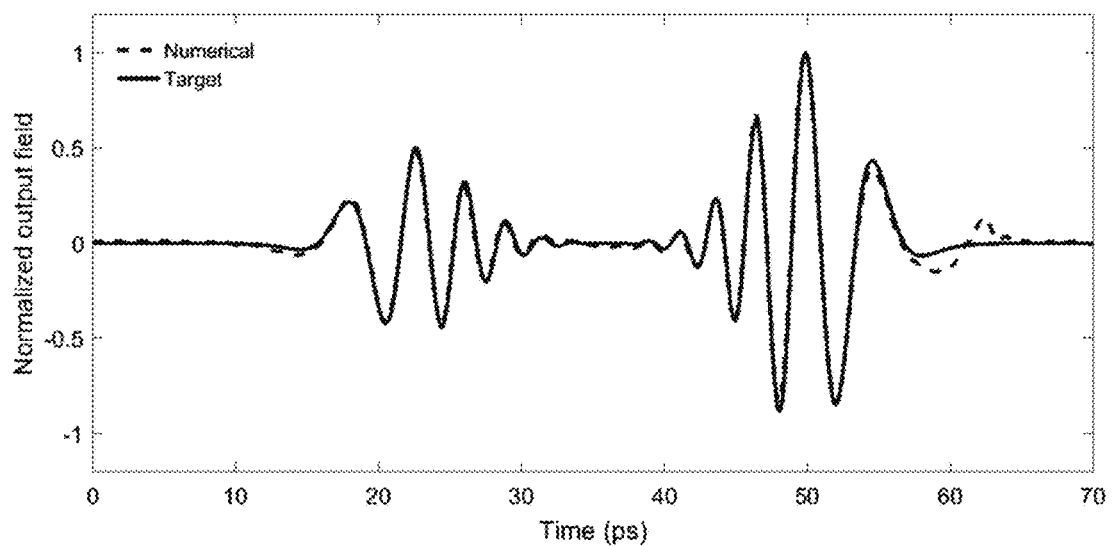
FIG. 15B illustrates the numerically computed (dashed line) and the targeted ground-truth (solid line) output pulses in time domain.
Figure 15C:
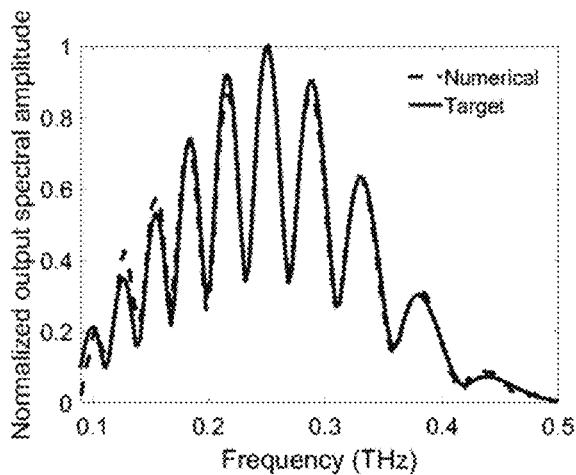
FIG. 15C illustrates the normalized spectral amplitudes corresponding to the numerically computed (dashed) and the target (solid) pulses.
Figure 15D:
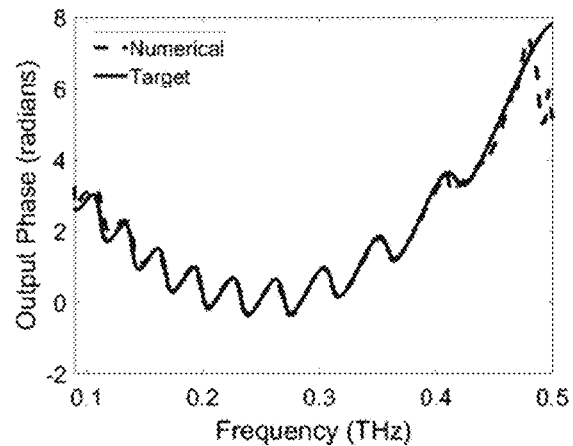
FIG. 15D illustrates the unwrapped spectral phase distributions computed based on the numerical forward model (dashed line) and the target (solid) pulse.
Figure 16A:
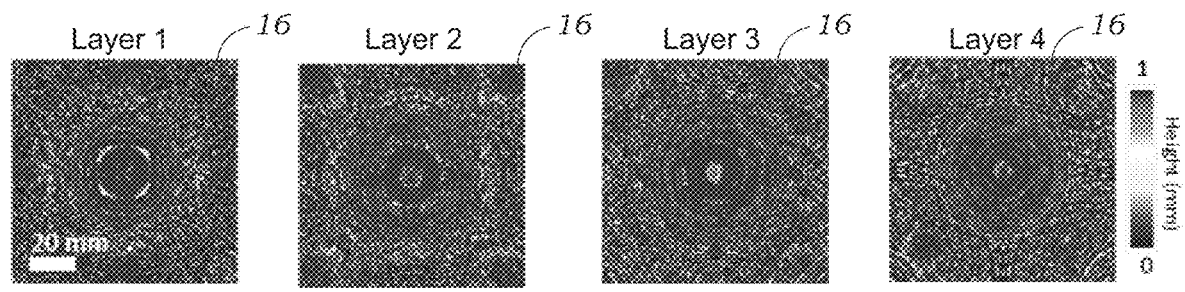
FIG. 16A illustrates the thickness profiles of the resulting diffractive layers of a generic pulse shaping diffractive network design for synthesizing a sequence of chirp-free Gaussian pulses after deep learning-based training in a computer. These diffractive layers synthesize a sequence of chirp-free Gaussian pulses over the output aperture of the diffractive network.
Figure 16B:
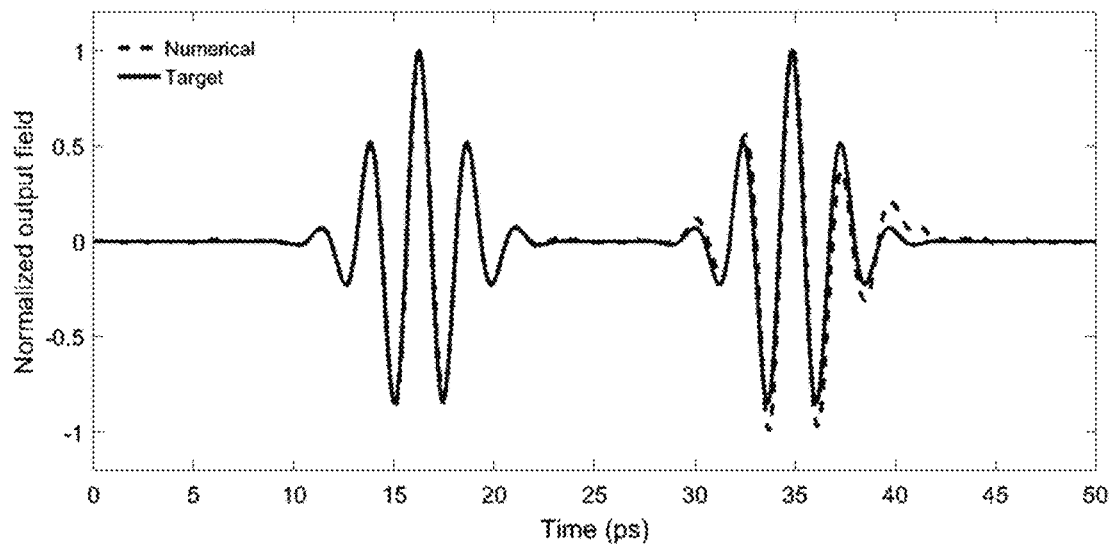
FIG. 16B illustrates the numerically computed (dashed line) and the targeted ground-truth (solid line) output pulses in time domain.
Figure 16C:
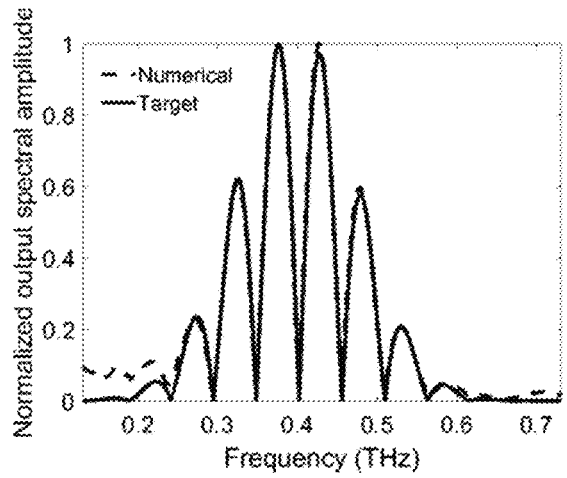
FIG. 16C illustrates the normalized spectral amplitudes corresponding to the numerically computed (dashed) and the target (solid) pulses.
Figure 16D:
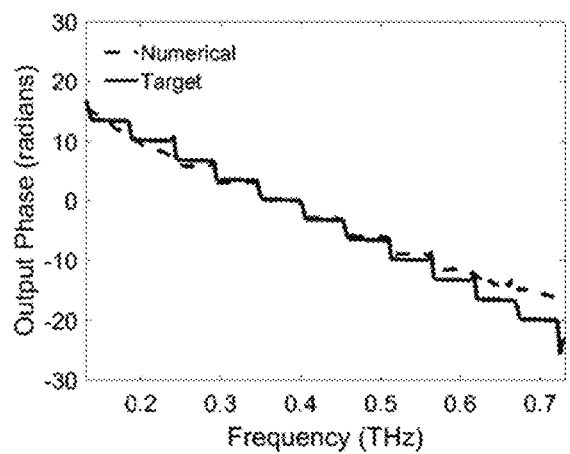
FIG. 16D illustrates the unwrapped spectral phase distributions computed based on the numerical forward model (dashed line) and the target (solid) pulse.

For example, with reference to FIGS. 13A-13C, various strategies may be employed to increase the power efficiency of the diffractive network 10. The diffractive networks 10 reported in FIGS. 13A-13C were trained to synthesize 15.5 ps square pulses at their output plane. As one can observe in FIGS. 13A-13C, the power efficiency values of the resulting diffractive models can be increased by more than an order of magnitude by adjusting the training loss function, increasing the output aperture 36 size and using low absorption materials. For example, as reported in the second column of table in FIGS. 13A-13C, when the material absorption is ignored during the testing of a diffractive network model, a 2-fold wider output aperture 36 (i.e., 4 mm) provides a significant improvement in the power efficiency of the pulse shaping networks, reaching 60.37 and 61% for two different network models (FIGS. 13A, 13B). On the other hand, if the absorption of the 3D-printing material is taken into account as part of the optical forward model, one can reach an efficiency value of 17.84% by accordingly optimizing the training loss function and using a 4 mm output aperture (FIG. 13C).

By comparing the top and bottom efficiency values for a given training loss function and design strategy reported in FIGS. 13A-13C, one clearly sees that the 3D-printing material that was used decreases the pulse shaping network efficiency 2-5 times, in different designs, compared to an ideal, non-absorbing optical material. As an alternative fabrication material for diffractive pulse shaping networks 10, one can consider low-absorption polymers used in commercially available components designed for THz wavelengths, such as TPX, which exhibits a two orders-of-magnitude smaller absorption coefficient compared to the 3D printing material used herein. There have been various fabrication processes developed for such low absorption polymers which can be used to precisely control the thickness of these low-loss polymers with a relatively high-resolution to manufacture pulse shaping diffractive networks 10 with much lower material absorption. To even further improve the output efficiency of pulse shaping diffractive networks 10, anti-reflective (AR) coatings over diffractive surfaces can also be utilized to reduce back-reflections, similar to the AR-coated commercial lenses and other optical components.

FIGS. 4A-4C further demonstrates three additional generic pulse shaping diffractive network models that were trained with a flat input spectrum and experimentally tested using the terahertz setup to achieve different output pulse shape or waveform profiles 22 (in this case square pulses), with pulse widths of 11.25 ps, 13.45 ps and 16.69 ps, respectively, demonstrating a very good match to their numerical counterparts. The numerically computed peak frequencies for these three different diffractive networks were 399.4 GHz, 396.1 GHz and 399.4 GHz, which were measured experimentally as 399.1 GHz, 402.2 GHz and 401.8 GHz, respectively. As one moves towards higher optical frequencies beyond 0.6 THz, the experimental spectral amplitude distributions start to deviate from their numerically predicted counterparts. Considering that the maximum material thickness of the layers 16 in the model is ~1 mm, at higher optical frequencies corresponding to wavelengths below ~0.5 mm, the light may travel more than 2 wavelengths inside a diffractive feature 20 (depending on the final trained model) which will then violate the thin modulation layer assumption in the forward model contributing to some of the experimental errors observed in FIGS. 4A-4C. In addition, the size each diffractive feature 20 corresponding to a unique complex-valued modulation per neuron (see Methods) was chosen to be 0.5 mm due to the limited lateral resolution of the 3D printer. Therefore, for higher frequencies, the light fields are modulated at each diffractive layer 16 with 2D functions sampled at lower spatial rates, which, in return, partially limits the design capabilities of the diffractive networks 10 at those smaller wavelengths of the pulse bandwidth. Furthermore, the uneven surface profile in 3D printing combined with thickness variations induced by fabrication imperfections contribute to some additional sources of experimental errors observed in the results.

To further demonstrate the design capabilities of the diffractive networks 10 for pulse shaping, in addition to the square pulses with various temporal widths reported earlier, three new diffractive network models were trained that were designed to output (1) a chirped-Gaussian pulse (FIGS. 14A-14D), (2) a sequence of positive and negative chirped Gaussian pulses, one following another (FIGS. 15A-15D), and (3) a sequence of two chirp-free Gaussian pulses (FIGS. 16A-16D). These results report a very good match, both in time and spectral domains, between the target, ground-truth pulse profiles and the corresponding output pulses 14 synthesized by the trained diffractive networks 10, clearly demonstrating the versatile nature of the presented framework to synthesize arbitrary pulses, engineered through the deep learning-based design of diffractive layers 16.

Figure 5B:
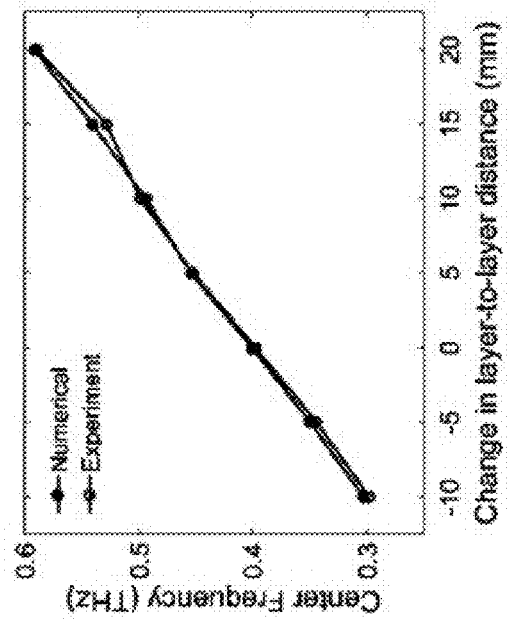
FIGS. 5A-5H illustrate the temporal pulse width tunability of diffractive networks.
Figure 5D:
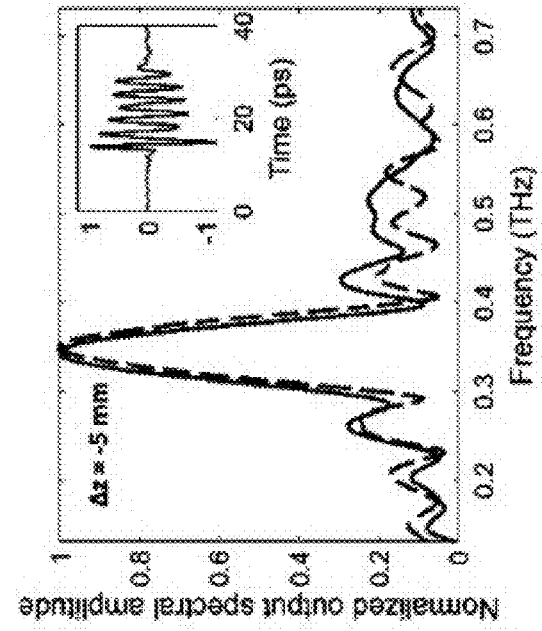

Next, the temporal width tunability of pulse shaping diffractive networks 10 was demonstrated despite the passive nature of their layers 16. By changing the axial distance along the optical path 14 between successive diffractive layers 16 by ΔZ, the temporal width and the peak frequency of the output waveform 22 can be tuned without any further training or a change to the 3D printed diffractive layers 16. This pulse-width tunability was demonstrated using the 3D printed diffractive network 10 depicted in FIGS. 9A-9D, but a similar tunability also applies to the network models shown in FIGS. 4A-4C. Since the diffractive networks 10 used 30 mm layer-to-layer distance in their design, the ΔZ range was considered to be between −10 mm to 20 mm; for instance, when ΔZ is taken as −10 mm, the axial distance between all the successive layers 16 of the diffractive network 10 is set to be 20 mm. Within this axial tuning range, FIGS. 5A-5H demonstrate the effect of changing this layer-to-layer distance of an already designed/trained diffractive network 10 on the output waveform 22 and its complex-valued spectrum. The results reveal that as the diffractive layers 16 get closer to each other axially, i.e., a negative ΔZ, the pulse-width of the output waveform 22 increases and the peak frequency decreases. For instance, when the axial distance between each diffractive layer 16 of the design shown in FIGS. 9A-9D is decreased by 5 mm (ΔZ=−5 mm) as shown in FIG. 5D, the peak of the spectral amplitude distribution shifts from 399.4 GHz to 349.1 GHz according to the numerical forward model. The pulse-width of the resulting square pulse 22 at the output aperture was numerically found to be 17.59 ps suggesting a longer pulse compared to 15.56 ps synthesized by the original design, ΔZ=0 mm (FIG. 5D). The experimentally measured pulse width with the same amount of axial change in the layer-to-layer distance of the diffractive network 10 revealed a 17.56 ps pulse after the spectral normalization step, confirming the tunability of the pulse shaping diffractive network 10 and also providing a very good match to the numerical results (FIGS. 5A-5H).

Figure 5A:
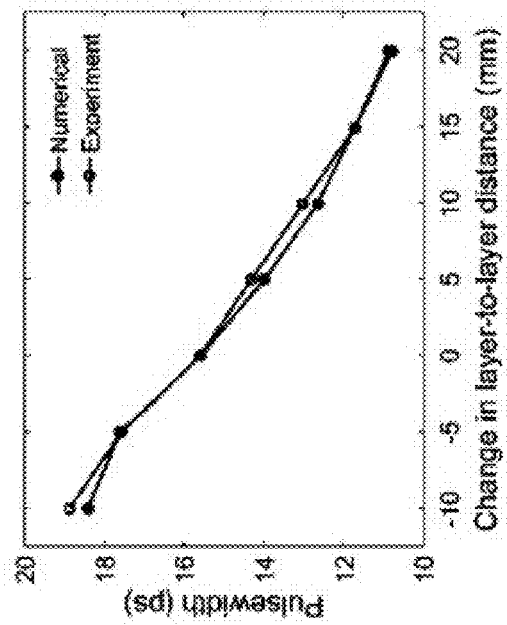
Figure 5C:
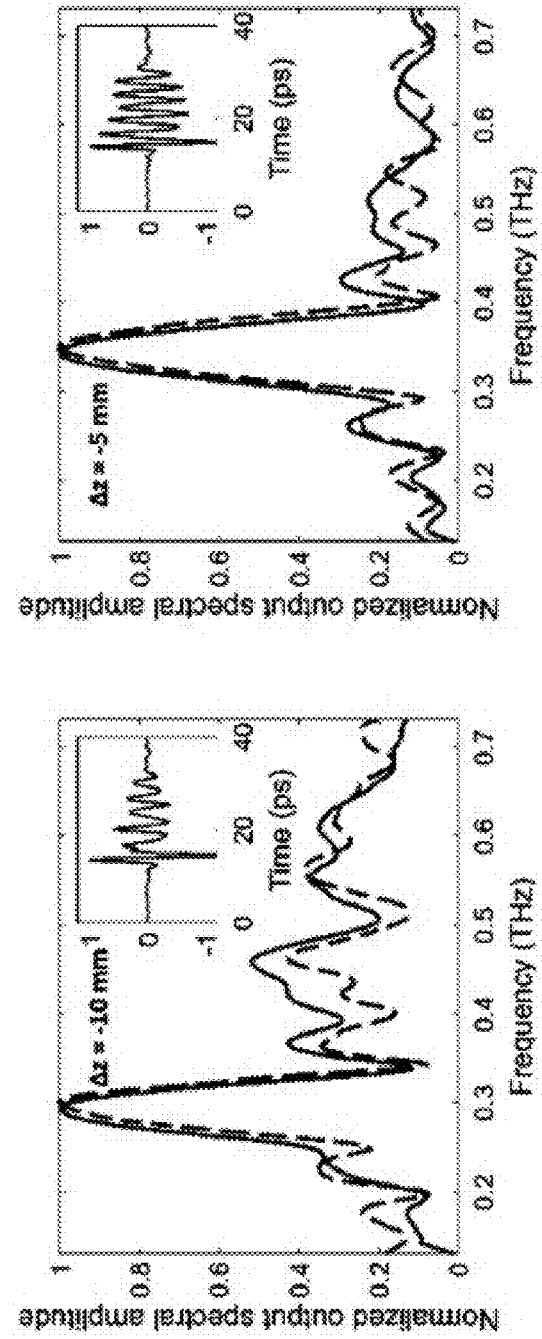
Figure 5E:
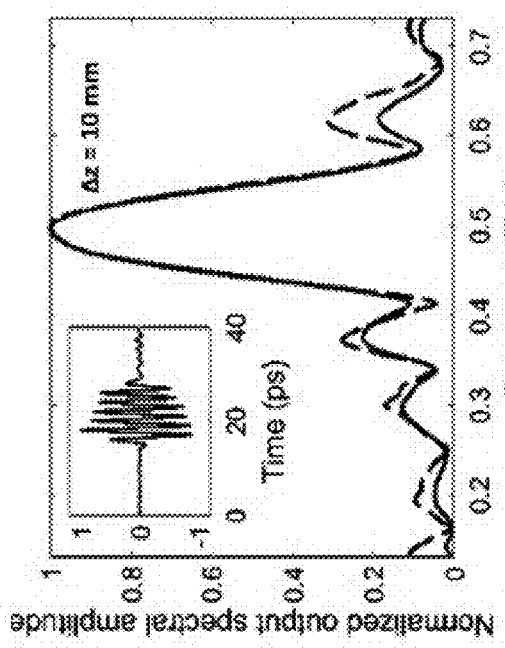
Figure 5F:
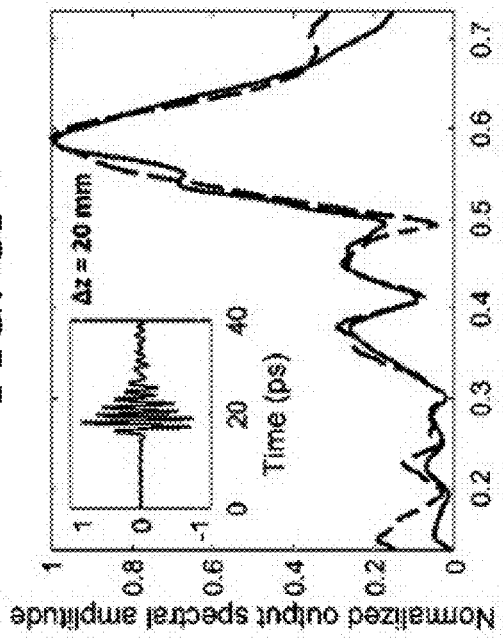
Figure 5G:
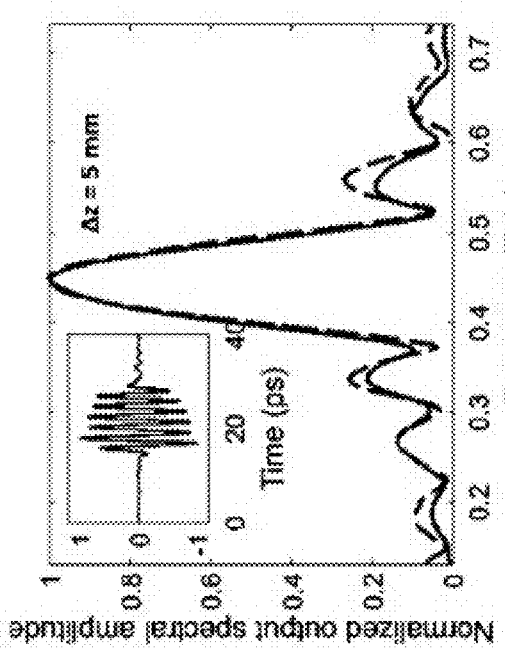
Figure 5H:
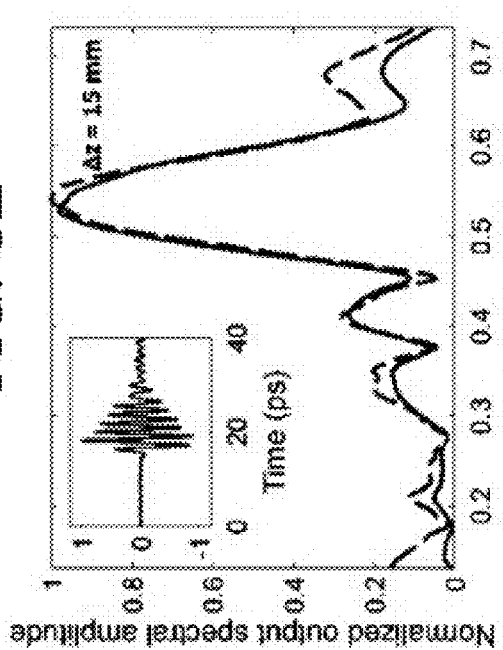

When the layer-to-layer distance is increased, i.e., a positive ΔZ, the output square pulse 22 gets narrower in time domain with an accompanying shift in the peak frequency toward higher values. FIG. 5E demonstrates an example of this case with ΔZ=5 mm, i.e., the distance between each diffractive layer 16 is increased to 35 mm. In this case, the experimentally measured and numerically computed square pulses 22 at the output plane have peak frequencies of 451.4 GHz and 453.1 GHz, with the corresponding pulse-widths of 14.3 ps and 13.97 ps, respectively, once again confirming the tunability of the pulse shaping diffractive networks 10 and demonstrating a very good agreement between the numerical forward model and the experiments. As one further increases ΔZ beyond 10 mm (depicted in FIG. 5F), the time domain pulse continues to get narrower.

Figure 6A:
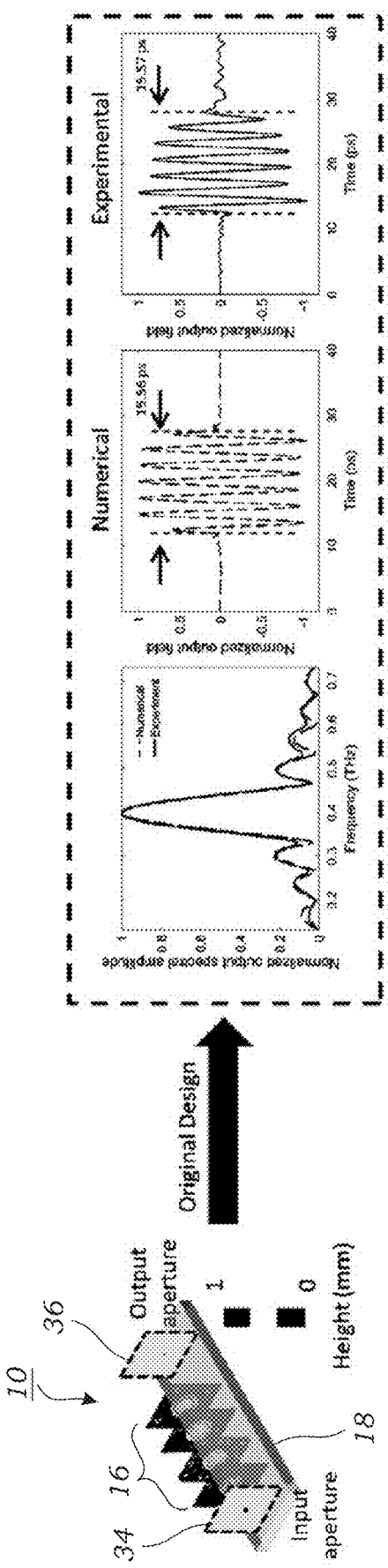
FIGS. 6A-6C illustrates changing the output temporal waveform by a physical transfer learning approach for pulse shaping diffractive networks.
Figure 6B:
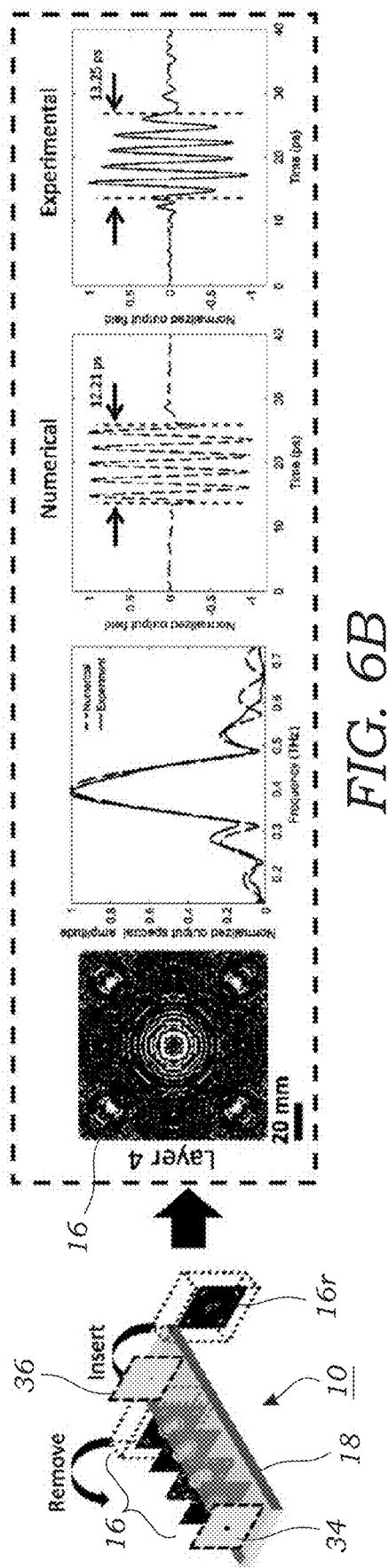
Figure 6C:
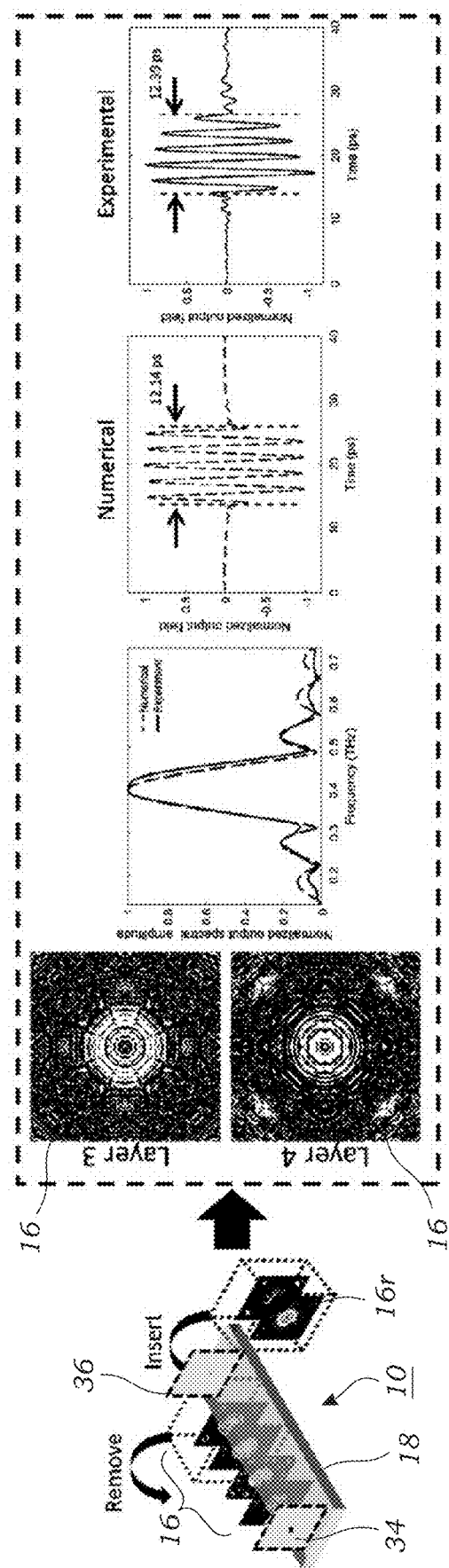

To further explore methods to alter a given fabricated diffractive network 10 and the output pulse shape or waveform profile 22, next a physical i.e., transfer learning approach was used to demonstrate pulse-width tunability by updating only part of a pre-trained network 10 with newly trained and fabricated diffractive layers 16, showing the modularity of a diffractive pulse shaping network 10. For this aim, the pre-trained network 10 that experimentally synthesized a 15.57 ps square waveform 22, noted as the original design in FIG. 6A, was used and further trained only the last diffractive layer 16 to synthesize a new desired output waveform 22, i.e., a 12.03 ps square pulse, by keeping the first three layers 16 as they are (already fabricated). This transfer learning approach was experimentally validated as shown in FIG. 6B by removing the existing last diffractive layer 16 and inserting a newly trained layer 16, fabricated using the same 3D printer. Numerical and experimental results revealed very good match to each other for the normalized output spectral amplitude over a wide frequency range as well as for the normalized output field waveform 22, generating pulse-widths of 12.21 ps and 13.25 ps, respectively. Next, an alternative approach was taken: this time, the last two diffractive layers 16 were replaced with new diffractive layers 16 trained to generate as the output pulse shape or waveform profile 22 square pulses (12.03 ps). As illustrated in FIG. 6C, with the addition of these two new diffractive layers 16 to the already existing first two layers 16, the resulting new diffractive network 10 successfully demonstrated the synthesis of 12.14 ps and 12.39 ps waveforms 22 at the output aperture for the numerical and experimental waveforms, respectively. The peak frequency of the new network model was calculated to be at 399.4 GHz and it was experimentally measured to be at 399.8 GHz, showing once again a very good match between the numerical forward model and experimental results. Overall, the insertion of two newly trained layers 16, when compared to a single newly trained layer 16 added on top of the existing layers 16 of a 3D-fabricated diffractive network 10, provided us improved performance for achieving the new pulse form that is desired.

Discussion

The intrinsic pulse-width tunability of a given diffractive network 10 that is achieved by changing the axial layer-to-layer distance is an interesting feature that was demonstrated numerically and experimentally: FIG. 5A shows various pulse-widths 22 obtained at seven different layer-to-layer distances using an existing network design. As the layer-to-layer distance of a diffractive network 10 design increases, the temporal pulse-width at the output aperture gets smaller, without any further training or fabrication of new diffractive layers. This opens up the opportunity to synthesize new waveforms within a certain time window around the originally designed output pulse 22. In addition to that, an axial distance change between the existing layers 16 of a diffractive network 10 also shifts the center frequency of the output pulse 22 as shown FIG. 5B. As the diffractive layers 16 get closer to each other, a red-shift in the center frequency was observed. Another related aspect of this pulse shaping diffractive framework is its modularity to tune the output pulses 22 using a physical transfer learning approach. By training a new layer 16 (or multiple layers 16) to replace part of an existing, pre-trained diffractive network model, on demand synthesis of new output pulse shapes or waveform profiles 22 can be achieved, as demonstrated in FIGS. 6B, 6C. These results highlight some of the unique features of diffractive pulse shaping network 10 and how they can adapt to potential changes in the desired output pulse shapes or waveform profiles 22.

The spacing between the layers 16 may be accomplished in a number of ways. For example, the holder 18 may contain a mount that can be located (e.g., slid or placed) at any path along the optical path 14. This may permit the user to adjust the inter-layer distance as needed. Alternatively, the holder 18 may have incremental loading positions that the layers 16 can be placed into/removed from to alter the inter-layer distance. It is also contemplated that automated control of the inter-layer distance may be used by using a computer-controlled mount or stage that is able to adjust the relative positions of the layers 16 in the housing 18. This avoids the need to have to manually adjust the position of the layers 16 in the housing 18. This includes adjusting a single layer 16 or multiple layers 16 in the diffractive network 10.

The presented pulse shaping diffractive network 10 has a compact design, with an axial length of approximately $250 \times \lambda_0$, where $\lambda_0$ denotes the peak wavelength. Moreover, it does not utilize any conventional optical components such as spatial light modulators, which makes it ideal for pulse shaping in terahertz part of the spectrum, where high-resolution spatio-temporal modulation and control of complex wavefronts over a broad bandwidth represent a significant challenge. In addition to being compact and much simpler compared to previous demonstrations of pulse shaping in terahertz spectrum, the results present the implementation of direct pulse shaping in terahertz band, where the learned complex-valued spectral modulation function of the diffractive network 10 directly acts on terahertz frequencies for pulse engineering. This capability enables new opportunities: when merged with appropriate fabrication methods and materials, the presented pulse shaping approach can be used to directly engineer terahertz pulses generated through quantum cascade lasers, solid-state circuits and particle accelerators. Another major advantage of this deep learning-based approach is that it is versatile and can be easily adapted to engineer terahertz pulses irrespective of their polarization state, beam quality as well as spectral/spatial aberrations.

A modular pulse shaping diffractive network 10 is disclosed that synthesizes various output pulse shapes or waveform profiles 22 using deep learning. Precise shaping of the spectral amplitude and phase profile of an arbitrary input pulse over a wide frequency range can be achieved using this platform, which will be transformative for various applications including e.g., communications, pulse compression, ultra-fast imaging and spectroscopy. In addition to direct engineering of terahertz pulses, the presented diffractive pulse shaping network 10 can be utilized in different parts of the electromagnetic spectrum by using appropriate fabrication technologies and materials.

Methods

Terahertz Setup

FIGS. 2A-2C illustrate the terahertz time-domain spectroscopy (THz-TDS) setup that was used to measure the input and output pulse profiles 12, 22 reported herein. A Ti:sapphire laser (Coherent Mira HP) is used to generate femtosecond optical pulses 12. The optical beam generated by the laser is split into two parts. One part of the beam is used to pump a high-power plasmonic photoconductive terahertz source to generate terahertz pulses, which are collimated with off-axis parabolic mirrors and guided to a high-sensitivity plasmonic photoconductive terahertz detector 32. The other part of the beam passes through an optical delay line (Newport IMS300LM) and is focused onto the terahertz detector 32. As a result, an ultrafast signal which is directly proportional to the incident terahertz field is generated within the terahertz detector 32. The signal is sampled with a 12.5 fs time-resolution over a 400 ps time-window by changing the time delay between the terahertz and optical probe pulses incident on the detector 32, amplified with a transimpedance pre-amplifier (Femto DHPCA-100), and acquired with a lock-in amplifier (Zurich Instruments MFLI). For each measurement, 10 time-domain traces are collected and averaged. The described THz-TDS setup provides a 90 dB signal-to-noise ratio over a 5 THz noise-equivalent-power bandwidth.

Each one of the pulse shaping diffractive networks 10 consists of four (4) trained layers 16 that are separated by 3 cm as illustrated in FIGS. 2A-2D. The diffractive layers 16, input and output apertures, were fabricated using a 3D Printer (Objet30 Pro, Stratasys Ltd.). The fabrication/preparation of each diffractive layer 16 takes approximately 1.5-2 hours. A square input aperture (0.8 cm) and an output aperture (0.2 cm) are placed 3 cm from the first diffractive layer 16 and 10 cm from the last diffractive layer 16, respectively (FIG. 2C). Note that in other embodiments, the input and output apertures may be optional and were used in this specific experimental setup. The printed apertures were aluminum coated to prevent any light wave passing through the regions outside of the aperture. After the design and printing of the diffractive layers 16, they were placed at their corresponding locations inside a 3D printed holder 18 that ensures robust alignment between the layers 16. During the pulse shaping experiments, the diffractive network 10 was directly placed between the terahertz source that generated the input optical pulse or waveform 12 and the detector 32, coaxial with the terahertz input pulse 12 emanating from the source (FIGS. 2B, 2D). After the alignment of the diffractive network 10, the output pulse with the altered pulse shape or waveform profile 22 was measured and it was followed by the measurement of the reference input pulse 12 which was acquired by placing the same terahertz detector at the input aperture, without any diffractive layers 16 between the source and detector 32. For generic diffractive networks 10 that were trained with flat input spectra, the measured output pulse spectrum is normalized with respect to the measured reference input pulse and its spectral amplitude is smoothened around water absorption lines shown in FIGS. 4A-C through 6A-6C and FIGS. 9A-9D. The measured pulse width at the network output is defined as the width of the time interval that the envelope of the pulse amplitude is at least 20% of its maximum (see e.g., FIGS. 3A-3C through 6A-6C).

Forward Model

The forward model considers the layers of a diffractive network as thin modulation elements that are connected to the next layer through free space propagation. The modulation of neurons at each layer can be modeled as:

$$M^n(x_i,y_i,z_i,\lambda)=A^n(x_i,y_i,z_i,\lambda)\exp(j\varphi^n(x_i,y_i,z_i,\lambda)) \qquad (1)$$

where M represents the complex transmission/reflection coefficient. The field amplitude, phase, wavelength, and diffractive layer number are denoted by A, $\varphi$, $\lambda$ and n respectively. Free space propagation between each layer is calculated based on the Rayleigh-Sommerfeld formulation of diffraction that models a diffractive feature as source of a secondary wave:

$$W_i^n(x,y,z,\lambda) = \frac{z-z_i}{r^2}\left(\frac{1}{2\pi r}+\frac{1}{j\lambda}\right)\exp\left(\frac{j2\pi r}{\lambda}\right), \qquad (2)$$

where $r=\sqrt{(x-x_i)^2+(y-y_i)^2+(z-z_i)^2}$, $j=\sqrt{-1}$ and $W_i^n(x, y, z, \lambda)$ is the secondary wave generated by the $i^{th}$ neuron on $n^{th}$ layer at location $(x_i, y_i, z_i)$, respectively. Then, one can write the optical field at layer n at point $(x_i, y_i, z_i)$ as:

$$U^n(x_i,y_i,z_i,\lambda)=M^n(x_i,y_i,z_i,\lambda)\Sigma_k U^{n-1}(x_k,y_k,z_k,\lambda)W_k^{n-1}(x_i,y_i,z_i,\lambda), n\geq 1 \qquad (3)$$

Network Training

Figure 10:
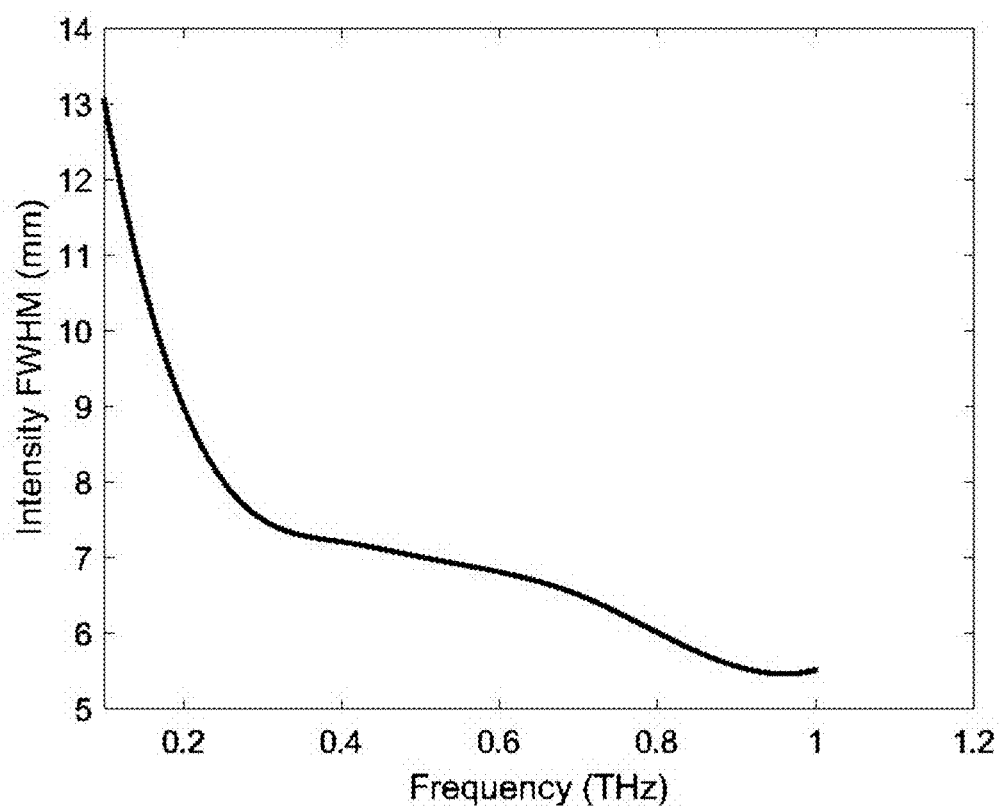
FIG. 10 illustrates experimentally measured full width half maximum (FWHM) values of spatial intensity profiles of different spectral components in the THz beam at the input aperture plane of the diffractive network.
Figure 11A:
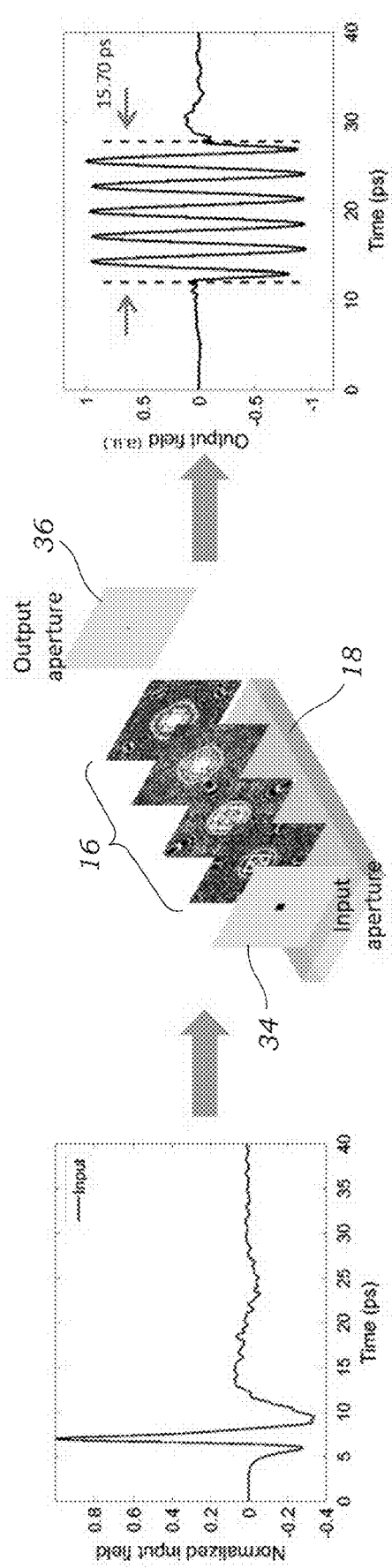
FIGS. 11A-11C illustrate the output temporal profile of the designed (FIGS. 11A, 11B) and fabricated (FIG. 11C) diffractive network that is trained to synthesize 15.7 ps square pulse for input pulse used in training (FIG. 11A) and experimentally measured input pulse (FIGS. 11B, 11C).
Figure 11B:
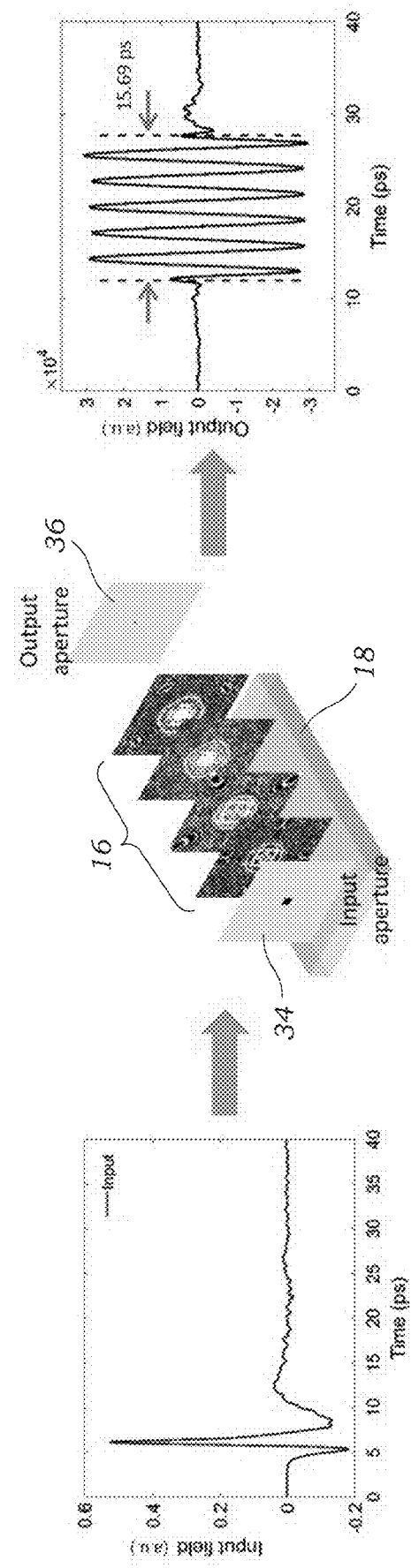
Figure 11C:
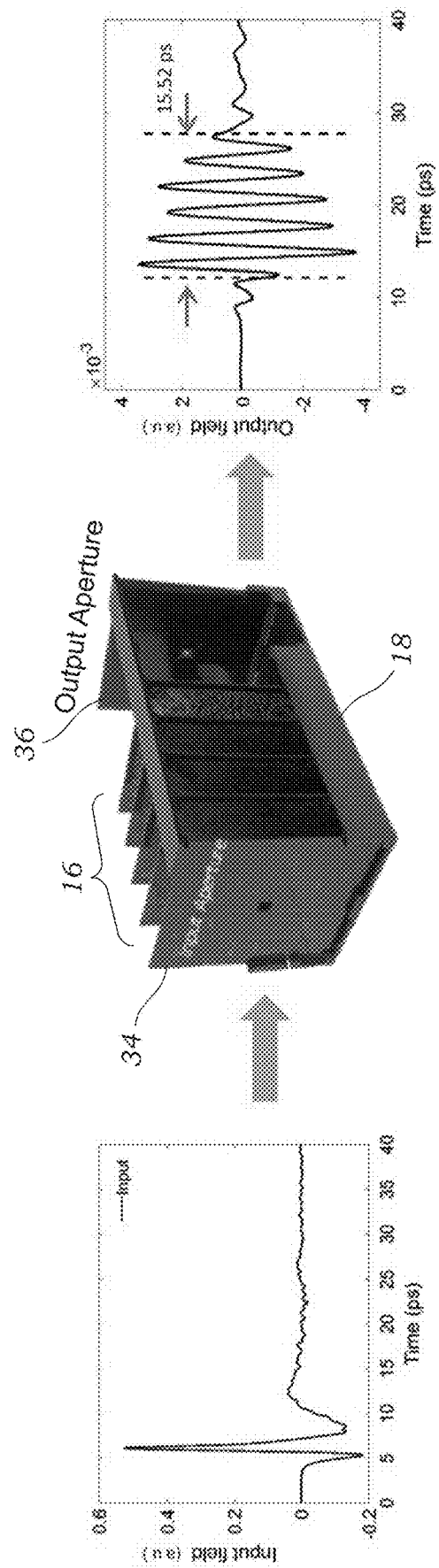
Figure 12A:
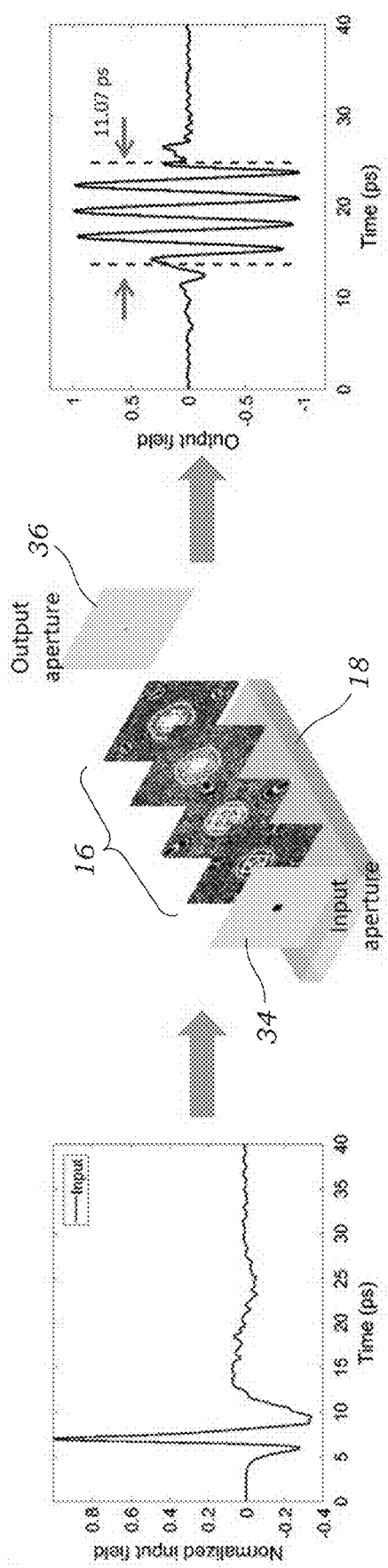
FIGS. 12A-12C illustrates the output temporal profile of the designed (FIGS. 12A, 12B) and fabricated (FIG. 12C) diffractive network that is trained to synthesize 11.07 ps square pulse for input pulse used in training (FIG. 12A) and experimentally measured input pulse (FIGS. 12B, 12C).
Figure 12B:
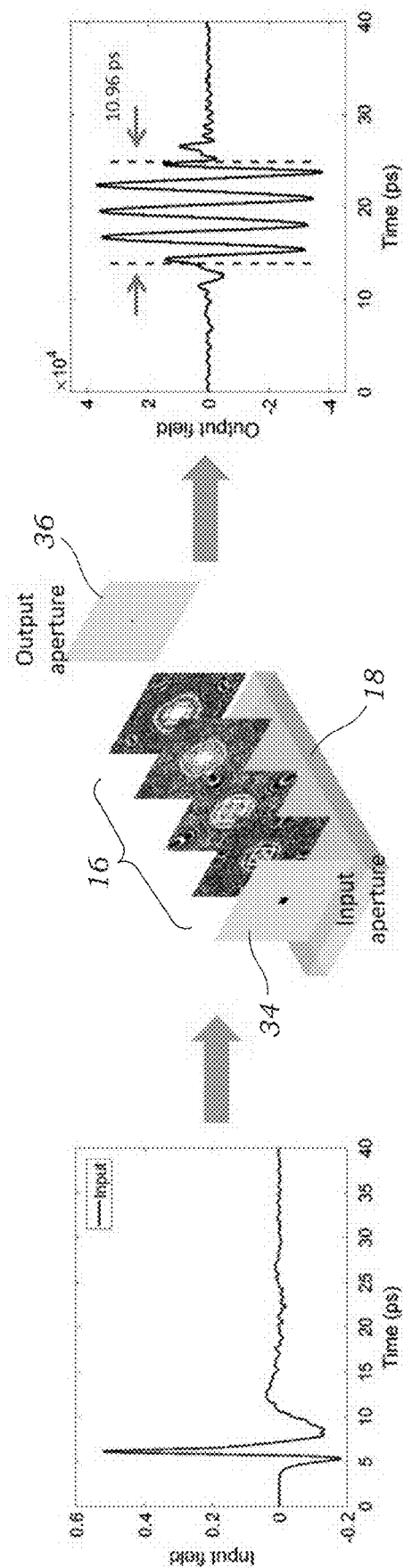
Figure 12C:
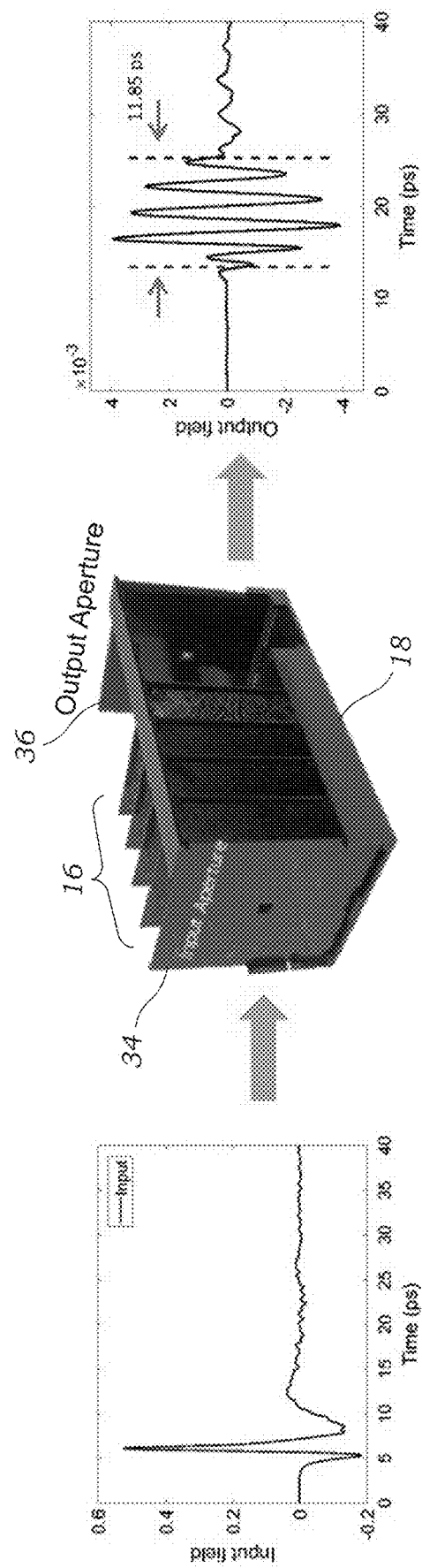

During the training of an electronic pulse shaping diffractive network, one of the five (5) pulses measured at the input plane (FIGS. 8A, 8B) were randomly selected as the input pulse 12 at each iteration of the training model for the diffractive networks 10 reported in FIGS. 3A-3C and 7A-7C; for the generic diffractive network models reported in FIGS. 4A-4C through 6A-6C and FIGS. 9A-9D, however, the input is modeled as a spectrally flat Gaussian beam with varying FWHM values over a wide frequency range (FIG. 10) and with a uniform phase profile. The wave propagation is performed for N=300 discrete frequencies that were uniformly sampled between 3 GHz and 1 THz.

In the wave propagation through the diffractive layers 16, a 0.5 mm pixel (i.e., diffractive feature) size is assumed based on the lateral resolution of the 3D printer. While a pixel size of 0.5 mm can create all the propagating modes of free-space for frequencies below ~300 GHz, they can only excite plane waves over a subset of the k-vectors supported by the free-space for the spectral components between 300 GHz and 1 THz. Therefore, diffractive pulse shaping networks 10 would in general benefit from higher resolution fabrication techniques with better lateral resolution to more accurately control and engineer the complex-valued spectral weights of a given desired pulse.

To calculate the Rayleigh-Sommerfeld integral more accurately, each pixel is oversampled twice so that all four (4) elements have the same thickness values in that 2×2 grid. The thickness of each pixel, h, is composed of a base height ($h_{base}$) of 0.1 mm, which provides adequate mechanical stiffness to the fabricated diffractive layer 16 and a trainable modulation height ($h_{tr}$) that is between 0 and 1 mm, i.e., $$h = h_{base} + h_{tr} \quad (4)$$

To confine the modulation height between 0 and 1 mm, we defined $h_{tr}$ over an auxiliary training-related variable, $h_a$, using:

$$h_{tr} = 0.5 \text{ mm} \times \{1 + \sin(h_a)\} \quad (5)$$

In its general form, the amplitude and phase modulation of each neuron of a given diffractive layer is a function of the layer thickness, incident wavelength, material extinction coefficient $\kappa(\lambda)$ and refractive index $n(\lambda)$, i.e., $$A^n(x, y, z, \lambda) = \exp\left(-\frac{2\pi\kappa(\lambda)h}{\lambda}\right) \quad (6)$$

$$\varphi^n(x, y, z, \lambda) = \frac{2\pi h(n(\lambda) - n_{air})}{\lambda} \quad (7)$$

The material refractive index $n(\lambda)$ and the extinction coefficient $\kappa(\lambda)$ are defined as the real and imaginary parts of the complex refractive index, $\tilde{n}(\lambda) = n(\lambda) + j\kappa(\lambda)$, determined by the dispersion of the 3D fabrication material of the layer 16. Since there are relatively small variations in the extinction coefficient over the frequency band that was utilized herein, the material absorption was ignored during the training and numerical simulations of diffractive layers 16.

After the wave propagation through diffractive layers 16, light goes through the output square aperture of 2 mm width, which is placed right in front of the hemisphere silicon lens which is 1.2 cm in diameter. Since the effective aperture of this Si lens was significantly restricted by the output aperture, it was modeled as a uniform slab with a refractive index of 3.4 and 0.5 cm thickness. After the propagation through the Si slab, the coherent integration of the optical waves incident on the active area of the detector 32 was computed to obtain the spectral field amplitude and phase for each frequency. The power efficiency was defined as $$\eta_{f_0} = \frac{I_{sensor, f_0}}{I_{input, f_0}}$$

for the peak/center frequency ($f_0$) of given diffractive network design, where $I_{input, f_0}$ and $I_{sensor, f_0}$ denote the power within the input and output apertures, respectively.

The loss function (L) used during the training phase has three components: temporal loss term ($L_t$) which penalizes the mismatch between the target and the output waveforms, the power loss term ($L_p$), and the power surrounding the detector region ($L_s$), i.e., $$L = \alpha L_t + \beta L_p + L_s \quad (8)$$

To calculate the temporal loss, $L_t$, first the output temporal waveform is reconstructed from the spectral field amplitude and phase on the detector area, and it is normalized. Then, the difference between the target temporal waveform and the reconstructed output waveform is integrated over time:

$$L_t = \Sigma_t (f_{target} - f_{output})^2 \quad (9)$$

where $f_{target}$ and $f_{output}$ denote the ground-truth, time-domain waveform and the synthesized waveform by the diffractive network model at a training iteration. For a given diffractive network model, $f_{output}$ is computed by propagating the input waves of all the spectral components from the input aperture 34 to the output aperture 36. Next, the complex-valued wave fields of these different wavelength components are integrated over the sensitive area of the detector to obtain each complex-valued spectral coefficient at the output, which is followed by an inverse Fourier transform operation over the resulting vector. Alternatively, the error term between a target, time-domain pulse, $f_{target}$, and the synthesized waveform by the diffractive network, $f_{output}$, can directly be computed based on the complex-valued spectral coefficients without any inverse Fourier transform operation. However, in this case, since the error is defined based on the complex-valued target and output functions, two separate error functions must be computed for the real and imaginary parts of the spectral coefficients and these two losses must be combined to compute the final loss term.

The analytical form of the square pulses used in this work can be written as: $f_{target}(t) = \text{rect}(bt)\cos(2\pi f_0 t)$, where $f_0$ and b represent the carrier frequency and the rectangular pulse-width, respectively. For the Gaussian pulses, however, the analytical form of the target waveform can be written as: $f_{target}(t) = \Sigma_{i=1}^{n} C_i \cos(2\pi f_0 (t - t_{0,i})) \exp(-(t - t_{0,i})^2 / (2p_i)) \exp(jq_i (t - t_{0,i})^2)$, where $t_{0,i}$, $C_i$, $p_i$ and $q_i$ denote the time instant of the peak, magnitude, variance of the low-pass envelope and the instantaneous angular chirpiness, respectively. The number of desired pulses inside a targeted time-window is determined by n. For the examples shown in FIGS. 14A-14D, 15A-15D, and 16A-16D, the target time domain waveforms were created by setting these parameters to [n=1, $t_0$=0, $C_1$=1, $p_1$=2.2×10$^{-22}$, $q_1$=5.76×10$^{21}$]; [n=2, $t_{0,1}$=0, $t_{0,2}$=27 ps, $C_1$=1, $C_2$=0.5, $p_1$=$p_2$=1.38×10$^{-23}$, $q_1$=6.25×10$^{22}$ $q_2$=−6.25×10$^{22}$]; and [n=2, $t_{0,1}$=0, $t_{0,2}$=19 ps, $C_1$=1, $C_2$=1, $p_1$=$p_2$=4.58×10$^{-24}$, $q_1$=$q_2$=0], respectively.

For the diffractive network designs shown in the last row of the table in FIGS. 13A-13C, a power loss term, $L_p$, was used, which is defined as:

$$L_p = \begin{cases} -\log\left(\frac{\eta}{\eta_{th}}\right), & \text{if } \eta < \eta_{th} \\ 0, & \text{if } \eta \geq \eta_{th} \end{cases} \quad (10)$$

where $$= \frac{\Sigma_\omega I_{sensor}}{\Sigma_\omega I_{input}}.$$

$I_{input}$ and $I_{sensor}$ denote the power within the input and output apertures 34, 36 for a given wavelength, respectively. For the diffractive network designs shown in the last row of the table of FIGS. 13A-13C, corresponding to 2 mm and 4 mm output apertures, $\eta_{th}$ was selected as 0.07 and 0.08, respectively. For the remaining designs reported herein, the power loss term is defined as:

$$L_p = \frac{\Sigma_\omega (I_{target} - I_{sensor})^2}{\Sigma_\omega I_{target}^2}, \quad (11)$$

where $I_{target}$ is the total power of the target waveform at a given wavelength within the input aperture, normalized with respect to the power of the input at the center frequency, $f_0$.

The last component of the loss function which represents the power surrounding the detector aperture is defined as:

$$L_s = \frac{\Sigma_\omega I_{surround}}{\Sigma_\omega I_{outputplane}}, \quad (12)$$

where $I_{surround}$ is the total power at a given wavelength within the 5 mm×5 mm square region that is centered around the output aperture (excluding the output aperture, i.e., it only measures the signal surrounding the output aperture) and $I_{output\ plane}$ is the total power at a given wavelength within the output plane.

The diffractive networks that synthesized 10.58 ps, 10.96 ps, 13.26 ps, 15.56 ps, 15.69 ps and 17.94 ps square terahertz pulses were trained with α/β ratios of 6500, 500, 4500, 1500, 750000 and 2500, respectively. For the physical transfer learning approach, an α/β ratio of 8500 was used. For FIGS. 14A-14D and 16A-16D, we used an ratio of 1500, and for FIGS. 15A-15D, $$\frac{\alpha}{\beta} = 15000$$

was used.

FIGS. 13A-13C reports a series of diffractive optical network designs that are trained to create a square pulse of 15.5 ps at their output apertures 36, achieving different levels of power efficiencies. Among the pulse shaping diffractive network models, the α/β ratio was adjusted depending on the size of the output aperture. Specifically, the diffractive networks targeting a 2 mm aperture at the output plane were trained with $$\frac{\alpha}{\beta} = 1500,$$

and this ratio was reduced to 136 for the diffractive pulse shaping systems with 4 mm wide output apertures. Finally, an α/β ratio of 150 was used for the diffractive optical networks that were trained with the power efficiency loss term described in Eq. 10.

In the training, Adam optimizer is used as a standard error backpropagation method with a learning rate of $10^{-3}$ for diffractive networks synthesizing 10.96 ps and 15.69 ps square pulses, and a learning rate of $0.8\times10^{-3}$ for pulses of FIGS. 14A-14D, 15A-15D, 16A-16D, and $10^{-4}$ for the other diffractive networks 10. All the trainable parameters were initialized as zero. The designs used Python (v3.7.3) and TensorFlow (v1.15.0) on a computer that has Nvidia Titan RTX graphical processing unit, Intel Core i9 CPU and 128 GB of RAM with Windows 10 operating system. MATLAB 2016b is used to convert designed diffractive layers 16 to a printable (.stl) file format.

While embodiments of the present invention have been shown and described, various modifications may be made without departing from the scope of the present invention. It should be appreciated that the diffractive network 10 may include optically transmissive layers and/or reflective layers. The invention, therefore, should not be limited, except to the following claims, and their equivalents.

What is claimed is:

1. A diffractive network device for altering a shape or waveform profile of an input optical pulse or waveform that has a given temporal and/or spatial shape or waveform profile into a desired output pulse shape or waveform profile comprising:
   a plurality of optically transmissive and/or reflective layers arranged in one or more optical paths, each of the plurality of optically transmissive and/or reflective layers comprising a plurality of physical features formed on or within the optically transmissive and/or reflective layers and having different complex-valued transmission and/or reflection coefficients as a function of lateral coordinates across each layer, wherein the plurality of optically transmissive and/or reflective layers and the plurality of physical features thereon collectively alter the input optical pulse or waveform that has a given temporal and/or spatial shape or waveform profile into the desired output pulse shape or waveform profile created by optical diffraction/reflection through/off the plurality of optically transmissive and/or reflective layers, wherein the input optical pulse or waveform comprises electromagnetic radiation having a wavelength between ultra-violet electromagnetic radiation and terahertz electromagnetic radiation.

2. The diffractive network device of claim 1, wherein the relative position(s) of the plurality of optically transmissive and/or reflective layers along the one or more optical paths are adjustable.

3. The diffractive network device of claim 2, wherein adjustment of the relative position(s) alters an output pulse width and/or a waveform profile.

4. The diffractive network device of claim 2, wherein adjustment of the relative position(s) alters an output center frequency of the resulting output pulse or waveform profile.

5. The diffractive network device of claim 1, wherein the plurality of optically transmissive and/or reflective layers are held within a holder with at least one optically transmissive and/or reflective layer being removably mounted in the holder.

6. The diffractive network device of claim 5, further comprising one or more replacement optically transmissive and/or reflective layers that are designed and used to replace one or more of the plurality of optically transmissive and/or reflective layers are held within the holder.

7. The diffractive network device of claim 1, wherein the desired output pulse shape or waveform profile comprises a square pulse.

8. The diffractive network device of claim 1, wherein one or more of the optically transmissive and/or reflective layers comprise reconfigurable spatial light modulators.

9. The diffractive network device of claim 1, further comprising one or more detectors configured to receive the output pulse or waveform from the plurality of optically transmissive and/or reflective layers.

10. The diffractive network device of claim 1, wherein the plurality of optically transmissive and/or reflective layers and the plurality of physical features thereon collectively generate an output pulse shape or waveform with a desired temporal and/or spatial shape or waveform profile created by optical diffraction/reflection through/off the plurality of optically transmissive and/or reflective layers, in response to the input optical pulse or waveform that has a given temporal and/or spatial shape or waveform profile.

11. The diffractive network device of claim 1, wherein the plurality of optically transmissive and/or reflective layers and the plurality of physical features thereon collectively generate a plurality of separate output pulse shapes or waveforms created by optical diffraction/reflection through/off the plurality of optically transmissive and/or reflective layers, in response to the input optical pulse or waveform that has a given temporal and/or spatial shape or waveform profile.

12. The diffractive network device of claim 1, wherein the plurality of optically transmissive and/or reflective layers and the plurality of physical features thereon collectively generate an output pulse shape or waveform that is temporally compressed or expanded relative to the input optical pulse or waveform.

13. A method of altering a shape or waveform profile of an input optical pulse or waveform that has a given temporal and/or spatial shape or waveform profile into a desired output pulse shape or waveform profile using a diffractive network device, comprising:

passing the input optical pulse or waveform through or onto a diffractive optical neural network device comprising a plurality of optically transmissive and/or reflective layers arranged in one or more optical paths, each of the a plurality of optically transmissive and/or reflective layers comprising a plurality of physical features formed on or within a plurality of optically transmissive and/or reflective layers and having different complex-valued transmission and/or reflection coefficients as a function of lateral coordinates across each layer, wherein a plurality of optically transmissive and/or reflective layers and the plurality of physical features thereon collectively alter the input optical pulse or waveform that has a given temporal and/or spatial shape or waveform profile into the desired output pulse shape or waveform profile created by optical diffraction/reflection through/off a plurality of optically transmissive and/or reflective layers, wherein the input optical pulse or waveform comprises electromagnetic radiation having a wavelength between ultraviolet electromagnetic radiation and terahertz electromagnetic radiation.

14. The method of claim 13, wherein the relative position(s) of the plurality of optically transmissive and/or reflective layers along the one or more optical paths are adjustable.

15. The method of claim 14, wherein adjustment of the relative position(s) alters an output pulse width and/or a waveform profile.

16. The method of claim 14, wherein adjustment of the relative position(s) alters an output center frequency of the resulting output pulse or waveform profile.

17. The method of claim 13, wherein the plurality of optically transmissive and/or reflective layers are held within a holder with at least one optically transmissive and/or reflective layer being removably mounted in the holder.

18. The method of claim 17, further comprising replacing one or more of the plurality of optically transmissive and/or reflective layers held within the holder with different optically transmissive and/or reflective layers.

19. The method of claim 13, wherein the desired output pulse shape or waveform profile comprises a square pulse.

20. The method of claim 13, wherein one or more of the optically transmissive and/or reflective layers comprise reconfigurable spatial light modulators.

21. The method of claim 13, further comprising receiving the output pulse from the plurality of optically transmissive and/or reflective layers with one or more detectors.

22. The method of claim 13, wherein the desired output pulse shape or waveform profile comprises a plurality of separate output pulse shapes or waveforms.

23. The method of claim 13, wherein the desired output pulse shape or waveform profile is temporally compressed or expanded relative to the input optical pulse or waveform.

* * * * *